(12) United States Patent
Milliken et al.

(10) Patent No.: US 8,204,945 B2
(45) Date of Patent: *Jun. 19, 2012

(54) HASH-BASED SYSTEMS AND METHODS FOR DETECTING AND PREVENTING TRANSMISSION OF UNWANTED E-MAIL

(75) Inventors: Walter Clark Milliken, Dover, NH (US); William Timothy Strayer, West Newton, MA (US); Stephen Douglas Milligan, Stow, MA (US)

(73) Assignee: Stragent, LLC, Longview, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/248,790

(22) Filed: Oct. 9, 2008

(65) Prior Publication Data

US 2009/0132669 A1 May 21, 2009

Related U.S. Application Data

(63) Continuation of application No. 10/654,771, filed on Sep. 4, 2003, and a continuation-in-part of application No. 10/654,771, and a continuation-in-part of application No. 10/251,403, filed on Sep. 20, 2002, now Pat. No. 7,328,349, said application No. 10/654,771 is a continuation-in-part of application No. 09/881,145, filed on Jun. 14, 2001, now abandoned, which is a continuation-in-part of application No. 09/881,074, filed on Jun. 14, 2001, now Pat. No. 6,981,158.

(60) Provisional application No. 60/407,975, filed on Sep. 5, 2002, provisional application No. 60/341,462, filed on Dec. 14, 2001, provisional application No. 60/212,425, filed on Jun. 19, 2000.

(51) Int. Cl.
*G06F 15/16* (2006.01)
(52) U.S. Cl. ........................................ 709/206; 709/224
(58) Field of Classification Search .......... 709/204–207, 709/223–224; 726/22
See application file for complete search history.

(56) References Cited

U.S. PATENT DOCUMENTS 3,956,615 A 5/1976 Anderson et al. ........ 235/61.7 B
4,104,721 A 8/1978 Markstein et al. ............ 364/200
(Continued)

FOREIGN PATENT DOCUMENTS

WO WO9605673 2/1996
(Continued)

OTHER PUBLICATIONS

Paul Graham; A Plan for Spam; http://www.paulgraham.com/spam.html; Aug. 2002; pp. 1-11.

(Continued)

*Primary Examiner* — Faruk Hamza
(74) *Attorney, Agent, or Firm* — Patrick E. Caldwell, Esq.; The Caldwell Firm, LLC

(57) ABSTRACT

A system (120) detects transmission of potentially unwanted e-mail messages. The system (120) may receive e-mail messages and generate hash values based on one or more portions of the e-mail messages. The system (120) may then determine whether the generated hash values match hash values associated with prior e-mail messages. The system (120) may determine that one of the e-mail messages is a potentially unwanted e-mail message when one or more of the generated hash values associated with the e-mail message match one or more of the hash values associated with the prior e-mail messages.

83 Claims, 9 Drawing Sheets

U.S. PATENT DOCUMENTS

| | | | |
|---|---|---|---|
| 4,177,510 A | 12/1979 | Appell et al. | 364/200 |
| 4,200,770 A | 4/1980 | Hellman et al. | 178/22 |
| 4,289,930 A | 9/1981 | Connolly et al. | 179/2 TV |
| 4,384,325 A | 5/1983 | Slechta, Jr. et al. | 364/200 |
| 4,386,233 A | 5/1983 | Smid et al. | 178/22.08 |
| 4,386,416 A | 5/1983 | Giltner et al. | 364/900 |
| 4,405,829 A | 9/1983 | Rivest et al. | 178/22.1 |
| 4,442,484 A | 4/1984 | Childs, Jr. et al. | 364/200 |
| 4,532,588 A | 7/1985 | Foster | 364/200 |
| 4,584,639 A | 4/1986 | Hardy | 364/200 |
| 4,590,470 A | 5/1986 | Koenig | 340/825.31 |
| 4,607,137 A | 8/1986 | Jansen et al. | 178/22.14 |
| 4,621,321 A | 11/1986 | Boebert et al. | 364/200 |
| 4,641,274 A | 2/1987 | Swank | 364/900 |
| 4,648,031 A | 3/1987 | Jenner | 364/200 |
| 4,701,840 A | 10/1987 | Boebert et al. | 364/200 |
| 4,710,763 A | 12/1987 | Franke et al. | 340/723 |
| 4,713,753 A | 12/1987 | Boebert et al. | 364/200 |
| 4,713,780 A | 12/1987 | Schultz et al. | 364/514 |
| 4,754,428 A | 6/1988 | Schultz et al. | 364/900 |
| 4,837,798 A | 6/1989 | Cohen et al. | 379/88 |
| 4,853,961 A | 8/1989 | Pastor | 380/21 |
| 4,864,573 A | 9/1989 | Horsten | 371/5.1 |
| 4,868,877 A | 9/1989 | Fischer | 380/25 |
| 4,870,571 A | 9/1989 | Frink | 364/200 |
| 4,885,789 A | 12/1989 | Burger et al. | 380/25 |
| 4,910,774 A | 3/1990 | Barakat | 380/23 |
| 4,914,568 A | 4/1990 | Kodosky et al. | 364/200 |
| 4,926,480 A | 5/1990 | Chaum | 380/23 |
| 4,947,430 A | 8/1990 | Chaum | 380/25 |
| 4,951,196 A | 8/1990 | Jackson | 364/401 |
| 4,975,950 A | 12/1990 | Lentz | 380/4 |
| 4,979,210 A | 12/1990 | Nagata et al. | 380/3 |
| 4,996,711 A | 2/1991 | Chaum | 380/30 |
| 5,005,200 A | 4/1991 | Fischer | 380/25 |
| 5,008,814 A | 4/1991 | Mathur | 364/200 |
| 5,020,059 A | 5/1991 | Gorin et al. | 371/11.3 |
| 5,051,886 A | 9/1991 | Kawaguchi et al. | 364/200 |
| 5,054,096 A | 10/1991 | Beizer | 382/41 |
| 5,070,528 A | 12/1991 | Hawe et al. | 380/48 |
| 5,093,914 A | 3/1992 | Coplien et al. | 395/700 |
| 5,105,184 A | 4/1992 | Pirani et al. | 340/721 |
| 5,119,465 A | 6/1992 | Jack et al. | 395/500 |
| 5,124,984 A | 6/1992 | Engel | 370/94.1 |
| 5,144,557 A | 9/1992 | Wang et al. | 364/419 |
| 5,144,659 A | 9/1992 | Jones | 380/4 |
| 5,144,660 A | 9/1992 | Rose | 380/4 |
| 5,144,665 A | 9/1992 | Takaragi et al. | 380/30 |
| 5,153,918 A | 10/1992 | Tuai | 380/25 |
| 5,164,988 A | 11/1992 | Matyas et al. | 380/25 |
| 5,167,011 A | 11/1992 | Priest | 395/54 |
| 5,191,611 A | 3/1993 | Lang | 380/25 |
| 5,200,999 A | 4/1993 | Matyas et al. | 380/25 |
| 5,204,961 A | 4/1993 | Barlow | 395/725 |
| 5,210,795 A | 5/1993 | Lipner et al. | 380/23 |
| 5,210,824 A | 5/1993 | Putz et al. | 395/145 |
| 5,210,825 A | 5/1993 | Kavaler | 395/147 |
| 5,214,702 A | 5/1993 | Fischer | 380/30 |
| 5,224,163 A | 6/1993 | Gasser et al. | 380/25 |
| 5,226,080 A | 7/1993 | Cole et al. | 380/25 |
| 5,228,083 A | 7/1993 | Lozowick et al. | 380/9 |
| 5,235,642 A | 8/1993 | Wobber et al. | 380/25 |
| 5,239,466 A | 8/1993 | Morgan et al. | 395/148 |
| 5,241,594 A | 8/1993 | Kung | 380/4 |
| 5,247,661 A | 9/1993 | Hager et al. | 395/600 |
| 5,263,147 A | 11/1993 | Francisco et al. | 395/425 |
| 5,263,157 A | 11/1993 | Janis | 395/600 |
| 5,265,163 A | 11/1993 | Golding et al. | 380/25 |
| 5,265,164 A | 11/1993 | Matyas et al. | 380/30 |
| 5,267,313 A | 11/1993 | Hirata | 380/21 |
| 5,272,754 A | 12/1993 | Boerbert | 380/25 |
| 5,276,735 A | 1/1994 | Boebert et al. | 380/21 |
| 5,276,736 A | 1/1994 | Chaum | 380/24 |
| 5,276,737 A | 1/1994 | Micali | 380/30 |
| 5,276,869 A | 1/1994 | Forrest et al. | 395/600 |
| 5,276,901 A | 1/1994 | Howell et al. | 395/800 |
| 5,278,901 A | 1/1994 | Shieh et al. | 380/4 |
| 5,280,527 A | 1/1994 | Gullman et al. | 380/23 |
| 5,283,887 A | 2/1994 | Zachery | 395/500 |
| 5,293,250 A | 3/1994 | Okumura et al. | 358/402 |
| 5,299,263 A | 3/1994 | Beller et al. | 380/30 |
| 5,303,303 A | 4/1994 | White | 380/49 |
| 5,305,385 A | 4/1994 | Schanning et al. | 380/49 |
| 5,311,591 A | 5/1994 | Fischer | 380/4 |
| 5,311,593 A | 5/1994 | Carmi | 380/23 |
| 5,313,521 A | 5/1994 | Torii et al. | 380/21 |
| 5,313,637 A | 5/1994 | Rose | 395/725 |
| 5,315,657 A | 5/1994 | Abadi et al. | 380/25 |
| 5,315,658 A | 5/1994 | Micali | 380/30 |
| 5,319,776 A | 6/1994 | Hile et al. | 395/575 |
| 5,325,370 A | 6/1994 | Cleveland et al. | 371/37.4 |
| 5,329,623 A | 7/1994 | Smith et al. | 395/275 |
| 5,333,266 A | 7/1994 | Boaz et al. | 395/200 |
| 5,341,426 A | 8/1994 | Barney et al. | 380/21 |
| 5,347,578 A | 9/1994 | Duxbury | 380/4 |
| 5,351,293 A | 9/1994 | Michener et al. | 380/21 |
| 5,355,472 A | 10/1994 | Lewis | 395/600 |
| 5,355,474 A | 10/1994 | Thuraisngham et al. | 395/600 |
| 5,359,659 A | 10/1994 | Rosenthal | 380/4 |
| 5,361,002 A | 11/1994 | Casper | 327/530 |
| 5,367,621 A | 11/1994 | Cohen et al. | 395/154 |
| 5,371,794 A | 12/1994 | Diffie et al. | 380/21 |
| 5,377,354 A | 12/1994 | Scannell et al. | 395/650 |
| 5,379,340 A | 1/1995 | Overend et al. | 379/93 |
| 5,379,374 A | 1/1995 | Ishizaki et al. | 395/155 |
| 5,386,470 A | 1/1995 | Carter et al. | 380/48 |
| 5,388,189 A | 2/1995 | Kung | 395/50 |
| 5,404,231 A | 4/1995 | Bloomfield | 358/400 |
| 5,406,557 A | 4/1995 | Baudoin | 370/61 |
| 5,406,628 A | 4/1995 | Beller et al. | 380/30 |
| 5,410,326 A | 4/1995 | Goldstein | 348/134 |
| 5,414,650 A | 5/1995 | Hekhuis | 364/715.02 |
| 5,414,833 A | 5/1995 | Hershey et al. | 395/575 |
| 5,416,842 A | 5/1995 | Aziz | 380/30 |
| 5,418,908 A | 5/1995 | Keller et al. | 395/200 |
| 5,424,724 A | 6/1995 | Williams et al. | 340/825.05 |
| 5,432,932 A | 7/1995 | Chen et al. | 395/650 |
| 5,436,972 A | 7/1995 | Fischer | 380/25 |
| 5,440,723 A | 8/1995 | Arnold et al. | 395/181 |
| 5,455,828 A | 10/1995 | Zisapel | 370/85.3 |
| 5,479,411 A | 12/1995 | Klein | 370/110.1 |
| 5,481,312 A | 1/1996 | Cash et al. | 348/466 |
| 5,481,613 A | 1/1996 | Ford et al. | 380/30 |
| 5,483,466 A | 1/1996 | Kawahara et al. | 364/514 |
| 5,485,409 A | 1/1996 | Gupta et al. | 395/186 |
| 5,485,460 A | 1/1996 | Schrier et al. | 370/94.1 |
| 5,491,750 A | 2/1996 | Bellare et al. | 380/21 |
| 5,495,610 A | 2/1996 | Shing et al. | 395/600 |
| 5,499,294 A | 3/1996 | Friedman | 380/10 |
| 5,504,454 A | 4/1996 | Daggett et al. | 329/304 |
| 5,509,074 A | 4/1996 | Choudhury et al. | 380/23 |
| 5,511,122 A | 4/1996 | Atkinson | 380/25 |
| 5,511,163 A | 4/1996 | Lerche et al. | 398/183.04 |
| 5,513,126 A | 4/1996 | Harkins et al. | 364/514 A |
| 5,513,323 A | 4/1996 | Williams et al. | 395/200.18 |
| 5,521,910 A | 5/1996 | Matthews | 370/256 |
| 5,530,852 A | 6/1996 | Meske, Jr. et al. | 395/600 |
| 5,535,276 A | 7/1996 | Ganesan | 380/25 |
| 5,537,533 A | 7/1996 | Staheli et al. | 395/182.03 |
| 5,539,824 A | 7/1996 | Bjorklund et al. | 380/21 |
| 5,541,993 A | 7/1996 | Fan et al. | 380/18 |
| 5,544,320 A | 8/1996 | Konrad | 395/200.09 |
| 5,548,646 A | 8/1996 | Aziz et al. | 380/23 |
| 5,550,984 A | 8/1996 | Gelb | 395/200.17 |
| 5,550,994 A | 8/1996 | Tashiro et al. | 395/375 |
| 5,553,145 A | 9/1996 | Micali | 380/30 |
| 5,555,309 A | 9/1996 | Kruys | 380/21 |
| 5,557,346 A | 9/1996 | Lipner et al. | 380/21 |
| 5,557,742 A | 9/1996 | Smaha et al. | 395/186 |
| 5,557,765 A | 9/1996 | Lipner et al. | 380/21 |
| 5,561,703 A | 10/1996 | Arledge et al. | 379/57 |
| 5,564,106 A | 10/1996 | Puhl et al. | 380/21 |
| 5,566,170 A | 10/1996 | Bakke et al. | 370/60 |
| 5,572,590 A | 11/1996 | Chess | 380/4 |
| 5,572,643 A | 11/1996 | Judson | 395/793 |
| 5,577,209 A | 11/1996 | Boyle et al. | 395/200.06 |
| 5,583,940 A | 12/1996 | Vidrascu et al. | 380/49 |

| Patent No. | Date | Inventor | Class |
|---|---|---|---|
| 5,583,995 A | 12/1996 | Gardner et al. | 395/200.09 |
| 5,586,260 A | 12/1996 | Hu | 395/200.2 |
| 5,602,918 A | 2/1997 | Chen et al. | 380/21 |
| 5,604,490 A | 2/1997 | Blakley, III et al. | 340/825.31 |
| 5,606,668 A | 2/1997 | Shwed | 395/200.11 |
| 5,608,819 A | 3/1997 | Ikeuchi | 382/156 |
| 5,608,874 A | 3/1997 | Ogawa et al. | 395/200.15 |
| 5,615,340 A | 3/1997 | Dai et al. | 395/200.17 |
| 5,619,648 A | 4/1997 | Canale et al. | 395/200.01 |
| 5,621,579 A | 4/1997 | Yuen | 386/121 |
| 5,621,889 A | 4/1997 | Lermuzeaux et al. | 395/186 |
| 5,623,598 A | 4/1997 | Voigt et al. | 395/184.01 |
| 5,623,600 A | 4/1997 | Ji et al. | 395/187.01 |
| 5,623,601 A | 4/1997 | Vu | 395/187.01 |
| 5,623,637 A | 4/1997 | Jones et al. | 395/491 |
| 5,625,695 A | 4/1997 | M'Raihi et al. | 380/28 |
| 5,627,977 A | 5/1997 | Hickey et al. | 395/329 |
| 5,629,982 A | 5/1997 | Micali | 380/30 |
| 5,631,961 A | 5/1997 | Mills et al. | 380/21 |
| 5,632,011 A | 5/1997 | Landfield et al. | 395/326 |
| 5,636,371 A | 6/1997 | Yu | 395/500 |
| 5,638,487 A | 6/1997 | Chigier | 395/2.62 |
| 5,640,454 A | 6/1997 | Lipner et al. | 380/21 |
| 5,644,404 A | 7/1997 | Hashimoto et al. | 358/402 |
| 5,644,571 A | 7/1997 | Seaman | 370/401 |
| 5,647,000 A | 7/1997 | Leighton | 380/30 |
| 5,649,095 A | 7/1997 | Cozza | 395/183.15 |
| 5,655,081 A | 8/1997 | Bonnell et al. | 395/200.32 |
| 5,657,461 A | 8/1997 | Harkins et al. | 395/333 |
| 5,666,416 A | 9/1997 | Micali | 380/23 |
| 5,666,530 A | 9/1997 | Clark et al. | 395/617 |
| 5,671,279 A | 9/1997 | Elgamal | 380/23 |
| 5,673,322 A | 9/1997 | Pepe et al. | 380/49 |
| 5,675,507 A | 10/1997 | Bobo, II | 364/514 R |
| 5,675,733 A | 10/1997 | Williams | 395/200.01 |
| 5,677,955 A | 10/1997 | Doggett et al. | 380/24 |
| 5,684,951 A | 11/1997 | Goldman et al. | 395/188.01 |
| 5,687,235 A | 11/1997 | Perlman et al. | 380/25 |
| 5,689,565 A | 11/1997 | Spies et al. | 380/25 |
| 5,689,566 A | 11/1997 | Nguyen | 380/25 |
| 5,694,616 A | 12/1997 | Johnson et al. | 395/860 |
| 5,696,822 A | 12/1997 | Nachenberg | 380/4 |
| 5,699,431 A | 12/1997 | Van Oorschot et al. | 380/30 |
| 5,699,513 A | 12/1997 | Feigen et al. | 395/187.01 |
| 5,706,442 A | 1/1998 | Anderson et al. | 395/227 |
| 5,706,507 A | 1/1998 | Schloss | 395/615 |
| 5,708,780 A | 1/1998 | Levergood et al. | 395/200.12 |
| 5,708,826 A | 1/1998 | Ikeda et al. | 395/762 |
| 5,710,883 A | 1/1998 | Hong et al. | 395/200.17 |
| 5,717,757 A | 2/1998 | Micali | 380/25 |
| 5,717,758 A | 2/1998 | Micali | 380/25 |
| 5,724,428 A | 3/1998 | Rivest | 380/37 |
| 5,724,512 A | 3/1998 | Winterbottom | 395/200.15 |
| 5,727,156 A | 3/1998 | Herr-Hoyman et al. | 395/200.49 |
| 5,740,231 A | 4/1998 | Cohn et al. | 379/89 |
| 5,742,759 A | 4/1998 | Nessett et al. | 395/187.01 |
| 5,742,769 A | 4/1998 | Lee et al. | 395/200.36 |
| 5,745,573 A | 4/1998 | Lipner et al. | 380/21 |
| 5,745,574 A | 4/1998 | Muftic | 380/23 |
| 5,751,956 A | 5/1998 | Kirsch | 395/200.33 |
| 5,758,343 A | 5/1998 | Vigil et al. | 707/10 |
| 5,761,531 A | 6/1998 | Ohmura et al. | |
| 5,764,906 A | 6/1998 | Edelstein et al. | 395/200.49 |
| 5,765,030 A | 6/1998 | Nachenberg et al. | |
| 5,768,388 A | 6/1998 | Goldwasser et al. | 380/30 |
| 5,768,528 A | 6/1998 | Stumm | 395/200.61 |
| 5,769,942 A | 6/1998 | Maeda | 117/89 |
| 5,771,348 A | 6/1998 | Kubatzki et al. | 395/186 |
| 5,778,372 A | 7/1998 | Cordell et al. | 707/100 |
| 5,781,729 A | 7/1998 | Baker et al. | 395/200.6 |
| 5,781,735 A | 7/1998 | Southard | 395/200.54 |
| 5,781,857 A | 7/1998 | Hwang et al. | 455/412 |
| 5,781,901 A | 7/1998 | Kuzma | 707/10 |
| 5,790,664 A | 8/1998 | Coley et al. | 380/4 |
| 5,790,789 A | 8/1998 | Suarez | 395/200.32 |
| 5,790,790 A | 8/1998 | Smith et al. | 395/200.36 |
| 5,790,793 A | 8/1998 | Higley | 395/200.48 |
| 5,790,856 A | 8/1998 | Lillich | 395/703 |
| 5,793,763 A | 8/1998 | Mayes et al. | 370/389 |
| 5,793,868 A | 8/1998 | Micali | 380/28 |
| 5,793,954 A | 8/1998 | Baker et al. | 395/200.8 |
| 5,793,972 A | 8/1998 | Shane | 395/200.49 |
| 5,796,830 A | 8/1998 | Johnson et al. | 380/21 |
| 5,796,942 A | 8/1998 | Esbensen | 395/187.01 |
| 5,796,948 A | 8/1998 | Cohen | 395/200.36 |
| 5,798,706 A | 8/1998 | Kraemer et al. | 340/825.07 |
| 5,799,083 A | 8/1998 | Brothers et al. | 380/20 |
| 5,801,700 A | 9/1998 | Ferguson | 345/349 |
| 5,802,178 A | 9/1998 | Holden et al. | 380/49 |
| 5,802,277 A | 9/1998 | Cowlard | 395/186 |
| 5,802,371 A | 9/1998 | Meier | 395/704 |
| 5,805,719 A | 9/1998 | Pare, Jr. et al. | 382/115 |
| 5,805,801 A | 9/1998 | Holloway et al. | 395/187.01 |
| 5,812,398 A | 9/1998 | Nielsen | 364/285.1 |
| 5,812,763 A | 9/1998 | Teng | 395/187.01 |
| 5,812,776 A | 9/1998 | Gifford | 395/200.47 |
| 5,812,844 A | 9/1998 | Jones et al. | 395/674 |
| 5,815,573 A | 9/1998 | Johnson et al. | 380/21 |
| 5,815,657 A | 9/1998 | Williams et al. | 395/186 |
| 5,821,398 A | 10/1998 | Speirs et al. | 800/205 |
| 5,822,526 A | 10/1998 | Waskiewicz | 395/200.36 |
| 5,822,527 A | 10/1998 | Post | 395/200.36 |
| 5,826,013 A | 10/1998 | Nachenberg | 395/186 |
| 5,826,014 A | 10/1998 | Coley et al. | 395/187.01 |
| 5,826,022 A | 10/1998 | Nielsen | 395/200.36 |
| 5,826,029 A | 10/1998 | Gore, Jr. et al. | 395/200.57 |
| 5,828,832 A | 10/1998 | Holden et al. | 395/187.01 |
| 5,828,893 A | 10/1998 | Wied et al. | 395/800 |
| 5,832,208 A | 11/1998 | Chen et al. | 395/187.01 |
| 5,835,087 A | 11/1998 | Herz et al. | 345/327 |
| 5,835,090 A | 11/1998 | Clark et al. | 345/339 |
| 5,835,600 A | 11/1998 | Rivest | 380/44 |
| 5,835,758 A | 11/1998 | Nochur et al. | 395/613 |
| 5,842,216 A | 11/1998 | Anderson et al. | 707/203 |
| 5,845,084 A | 12/1998 | Cordell et al. | 395/200.64 |
| 5,850,442 A | 12/1998 | Muftic | 381/21 |
| 5,852,665 A | 12/1998 | Gressel et al. | 380/30 |
| 5,855,020 A | 12/1998 | Kirsch | 707/10 |
| 5,857,022 A | 1/1999 | Sudia | 380/23 |
| 5,859,966 A | 1/1999 | Hayman et al. | 395/186 |
| 5,860,068 A | 1/1999 | Cook | 705/26 |
| 5,862,325 A | 1/1999 | Reed et al. | 395/200.31 |
| 5,864,667 A | 1/1999 | Barkan | 395/187.01 |
| 5,864,683 A | 1/1999 | Boebert et al. | 395/200.79 |
| 5,864,852 A | 1/1999 | Luotonen | 707/10 |
| 5,872,844 A | 2/1999 | Yacobi | 380/24 |
| 5,872,849 A | 2/1999 | Sudia | 380/49 |
| 5,872,931 A | 2/1999 | Chivaluri | 395/200.53 |
| 5,878,230 A | 3/1999 | Weber et al. | 395/200.68 |
| 5,884,033 A | 3/1999 | Duvall et al. | 395/200.36 |
| 5,889,943 A | 3/1999 | Ji et al. | 395/187.01 |
| 5,892,825 A | 4/1999 | Mages et al. | 380/3 |
| 5,892,903 A | 4/1999 | Klaus | 395/187.01 |
| 5,892,904 A | 4/1999 | Atkinson et al. | 395/187.01 |
| 5,893,114 A | 4/1999 | Hashimoto et al. | 707/200 |
| 5,896,499 A | 4/1999 | McKelvey | 395/187.01 |
| 5,898,830 A | 4/1999 | Wesinger, Jr. et al. | 395/187.01 |
| 5,898,836 A | 4/1999 | Freivald et al. | 395/200.48 |
| 5,901,227 A | 5/1999 | Perlman | 380/21 |
| 5,903,651 A | 5/1999 | Kocher | 380/25 |
| 5,903,723 A | 5/1999 | Beck et al. | 395/200.3 |
| 5,903,882 A | 5/1999 | Asay et al. | 705/44 |
| 5,905,859 A | 5/1999 | Holloway et al. | 395/187.01 |
| 5,907,618 A | 5/1999 | Gennaro et al. | 380/21 |
| 5,907,620 A | 5/1999 | Klemba et al. | 380/25 |
| 5,911,776 A | 6/1999 | Guck | 709/217 |
| 5,912,972 A | 6/1999 | Barton | 380/23 |
| 5,919,257 A | 7/1999 | Trostle | 713/200 |
| 5,919,258 A | 7/1999 | Kayashima et al. | 713/201 |
| 5,920,630 A | 7/1999 | Wertheimer et al. | 380/25 |
| 5,922,074 A | 7/1999 | Richard et al. | 713/200 |
| 5,923,846 A | 7/1999 | Gage et al. | 395/200.43 |
| 5,923,885 A | 7/1999 | Johnson et al. | 395/712 |
| 5,928,329 A | 7/1999 | Clark et al. | 709/227 |
| 5,930,479 A | 7/1999 | Hall | 395/200.68 |
| 5,933,478 A | 8/1999 | Ozaki et al. | 379/93.24 |
| 5,933,498 A | 8/1999 | Schneck et al. | 380/4 |
| 5,933,647 A | 8/1999 | Aronberg et al. | 395/712 |

| Patent No. | Date | Inventor | Class |
|---|---|---|---|
| 5,937,066 A | 8/1999 | Gennaro et al. | 380/21 |
| 5,937,164 A | 8/1999 | Mages et al. | 395/200.48 |
| 5,940,591 A | 8/1999 | Boyle et al. | 395/187.01 |
| 5,941,998 A | 8/1999 | Tillson | 714/54 |
| 5,946,679 A | 8/1999 | Ahuja et al. | 707/3 |
| 5,948,062 A | 9/1999 | Tzelnic et al. | 709/219 |
| 5,948,104 A | 9/1999 | Gluck et al. | 713/200 |
| 5,950,195 A | 9/1999 | Stockwell et al. | 707/4 |
| 5,951,644 A | 9/1999 | Creemer | 709/229 |
| 5,951,698 A | 9/1999 | Chen et al. | 714/38 |
| 5,956,403 A | 9/1999 | Lipner et al. | 380/21 |
| 5,956,481 A | 9/1999 | Walsh et al. | 395/186 |
| 5,958,005 A | 9/1999 | Thorne et al. | 709/202 |
| 5,958,010 A | 9/1999 | Agarwal et al. | 709/224 |
| 5,959,976 A | 9/1999 | Kuo | |
| 5,960,170 A | 9/1999 | Chen et al. | 395/183.14 |
| 5,963,915 A | 10/1999 | Kirsch | 705/26 |
| 5,964,889 A | 10/1999 | Nachenberg | 714/25 |
| 5,970,248 A | 10/1999 | Meier | 395/704 |
| 5,974,141 A | 10/1999 | Saito | 380/4 |
| 5,978,799 A | 11/1999 | Hirsch | 707/4 |
| 5,983,012 A | 11/1999 | Bianchi et al. | 395/500.44 |
| 5,983,228 A | 11/1999 | Kobayashi et al. | 707/10 |
| 5,987,606 A | 11/1999 | Cirasole et al. | 713/200 |
| 5,987,609 A | 11/1999 | Hasebe | 713/200 |
| 5,991,406 A | 11/1999 | Lipner et al. | 380/21 |
| 5,991,807 A | 11/1999 | Schmidt et al. | 709/225 |
| 5,991,879 A | 11/1999 | Still | 713/200 |
| 5,991,881 A | 11/1999 | Conklin et al. | 713/201 |
| 5,996,011 A | 11/1999 | Humes | 709/225 |
| 5,996,077 A | 11/1999 | Williams | 713/201 |
| 5,999,723 A | 12/1999 | Nachenberg | 395/500.43 |
| 5,999,932 A | 12/1999 | Paul | 707/10 |
| 5,999,967 A * | 12/1999 | Sundsted | 709/206 |
| 6,000,041 A | 12/1999 | Baker et al. | 714/39 |
| 6,003,027 A | 12/1999 | Prager | 707/5 |
| 6,006,329 A | 12/1999 | Chi | 713/200 |
| 6,009,103 A | 12/1999 | Woundy | 370/401 |
| 6,009,274 A | 12/1999 | Fletcher et al. | 395/712 |
| 6,009,462 A | 12/1999 | Birrell et al. | 709/206 |
| 6,012,144 A | 1/2000 | Pickett | 713/201 |
| 6,014,651 A | 1/2000 | Crawford | 705/400 |
| 6,021,510 A | 2/2000 | Nachenberg | 714/38 |
| 6,023,723 A | 2/2000 | McCormick et al. | 709/206 |
| 6,026,414 A | 2/2000 | Anglin | 707/204 |
| 6,029,256 A | 2/2000 | Kouznetsov | 714/38 |
| 6,035,423 A | 3/2000 | Hodges et al. | 714/38 |
| 6,038,233 A | 3/2000 | Hamamoto et al. | |
| 6,049,789 A | 4/2000 | Frison et al. | 705/59 |
| 6,052,531 A | 4/2000 | Waldin, Jr. et al. | 395/712 |
| 6,052,709 A | 4/2000 | Paul | 709/202 |
| 6,052,788 A | 4/2000 | Wesinger, Jr. et al. | 713/201 |
| 6,055,519 A | 4/2000 | Kennedy et al. | 705/80 |
| 6,058,381 A | 5/2000 | Nelson | 705/40 |
| 6,058,482 A | 5/2000 | Liu | 713/201 |
| 6,061,448 A | 5/2000 | Smith et al. | 380/21 |
| 6,061,722 A | 5/2000 | Lipa et al. | 709/224 |
| 6,067,410 A | 5/2000 | Nachenberg | 395/500.49 |
| 6,070,243 A | 5/2000 | See et al. | 713/201 |
| 6,072,942 A | 6/2000 | Stockwell et al. | 395/200.36 |
| 6,073,140 A | 6/2000 | Morgan et al. | 707/203 |
| 6,075,863 A | 6/2000 | Krishnan et al. | 380/49 |
| 6,078,929 A | 6/2000 | Rao | 707/200 |
| 6,085,320 A | 7/2000 | Kaliski, Jr. | 713/168 |
| 6,088,803 A | 7/2000 | Tso et al. | 713/201 |
| 6,088,804 A | 7/2000 | Hill et al. | 713/201 |
| 6,092,067 A | 7/2000 | Girling et al. | 707/100 |
| 6,092,102 A | 7/2000 | Wagner | 709/206 |
| 6,092,114 A | 7/2000 | Shaffer et al. | 709/232 |
| 6,092,191 A | 7/2000 | Shimbo et al. | 713/153 |
| 6,092,194 A | 7/2000 | Touboul | 713/200 |
| 6,092,201 A | 7/2000 | Turnbull et al. | 713/201 |
| 6,094,277 A | 7/2000 | Toyoda | 358/1.15 |
| 6,094,731 A | 7/2000 | Waldin et al. | 714/38 |
| 6,097,811 A | 8/2000 | Micali | 380/23 |
| 6,104,500 A | 8/2000 | Alam et al. | 358/1.15 |
| 6,108,683 A | 8/2000 | Kamada et al. | 709/103 |
| 6,108,688 A | 8/2000 | Nielsen | 709/206 |
| 6,108,691 A | 8/2000 | Lee et al. | 709/206 |
| 6,108,786 A | 8/2000 | Knowlson | 713/200 |
| 6,112,181 A | 8/2000 | Shear et al. | 705/1 |
| 6,118,856 A | 9/2000 | Paarsmarkt et al. | 379/93.24 |
| 6,119,137 A | 9/2000 | Smith et al. | 707/523 |
| 6,119,142 A | 9/2000 | Kosaka | 709/200 |
| 6,119,157 A | 9/2000 | Traversat et al. | 709/220 |
| 6,119,165 A | 9/2000 | Li et al. | 709/229 |
| 6,119,230 A | 9/2000 | Carter | 713/200 |
| 6,119,231 A | 9/2000 | Foss et al. | 713/200 |
| 6,119,236 A | 9/2000 | Shipley | 713/207 |
| 6,122,661 A | 9/2000 | Stedman et al. | 709/217 |
| 6,123,737 A | 9/2000 | Sadowsky | 717/11 |
| 6,134,550 A | 10/2000 | Van Oorschot et al. | 707/9 |
| 6,134,551 A | 10/2000 | Aucsmith | 707/10 |
| 6,138,254 A | 10/2000 | Voshell | 714/710 |
| 6,141,695 A | 10/2000 | Sekiguchi et al. | 709/246 |
| 6,141,778 A | 10/2000 | Kane et al. | 714/201 |
| 6,144,744 A | 11/2000 | Smith, Sr. et al. | 380/45 |
| 6,145,083 A | 11/2000 | Shaffer et al. | 713/201 |
| 6,151,643 A | 11/2000 | Cheng et al. | 710/36 |
| 6,151,675 A | 11/2000 | Smith | 713/153 |
| 6,154,769 A | 11/2000 | Cherkasova et al. | 709/207 |
| 6,154,844 A | 11/2000 | Touboul et al. | 713/201 |
| 6,154,879 A | 11/2000 | Pare et al. | 705/35 |
| 6,161,130 A | 12/2000 | Horvitz et al. | 709/206 |
| 6,161,137 A | 12/2000 | Ogdon et al. | 709/224 |
| 6,167,407 A | 12/2000 | Nachenberg et al. | 707/203 |
| 6,167,438 A | 12/2000 | Yates et al. | 709/216 |
| 6,169,969 B1 * | 1/2001 | Cohen | 704/10 |
| 6,178,242 B1 | 1/2001 | Tsuria | 380/201 |
| 6,178,509 B1 | 1/2001 | Nardone et al. | 713/200 |
| 6,182,142 B1 | 1/2001 | Win et al. | 709/229 |
| 6,182,226 B1 | 1/2001 | Reid et al. | 713/201 |
| 6,185,678 B1 | 2/2001 | Arbaugh et al. | 713/2 |
| 6,185,682 B1 | 2/2001 | Tang | 713/168 |
| 6,185,689 B1 | 2/2001 | Todd, Sr. et al. | 713/201 |
| 6,192,360 B1 | 2/2001 | Dumais et al. | 707/6 |
| 6,192,407 B1 | 2/2001 | Smith et al. | 709/229 |
| 6,199,102 B1 | 3/2001 | Cobb | 709/206 |
| 6,202,157 B1 | 3/2001 | Brownlie et al. | 713/201 |
| 6,215,763 B1 | 4/2001 | Doshi et al. | 370/216 |
| 6,216,265 B1 | 4/2001 | Roop et al. | 725/54 |
| 6,219,706 B1 | 4/2001 | Fan et al. | 709/225 |
| 6,219,714 B1 | 4/2001 | Inhwan et al. | 709/238 |
| 6,223,094 B1 | 4/2001 | Muehleck et al. | 700/107 |
| 6,223,172 B1 | 4/2001 | Hunter et al. | |
| 6,223,213 B1 | 4/2001 | Cleron et al. | 709/206 |
| 6,226,666 B1 | 5/2001 | Chang et al. | 709/202 |
| 6,230,190 B1 | 5/2001 | Edmonds et al. | 709/213 |
| 6,230,194 B1 | 5/2001 | Frailong et al. | 709/220 |
| 6,230,266 B1 | 5/2001 | Perlman et al. | 713/158 |
| 6,233,577 B1 | 5/2001 | Ramasubramani et al. | 707/9 |
| 6,240,401 B1 | 5/2001 | Oren et al. | 705/40 |
| 6,243,815 B1 | 6/2001 | Antur et al. | 713/201 |
| 6,249,575 B1 | 6/2001 | Heilmann et al. | 379/189 |
| 6,249,585 B1 | 6/2001 | McGrew et al. | 380/286 |
| 6,249,807 B1 | 6/2001 | Shaw et al. | 709/206 |
| 6,253,337 B1 | 6/2001 | Maloney et al. | 714/38 |
| 6,260,043 B1 | 7/2001 | Puri et al. | 707/101 |
| 6,260,142 B1 | 7/2001 | Thakkar et al. | 713/158 |
| 6,266,337 B1 | 7/2001 | Marco | |
| 6,266,668 B1 | 7/2001 | Vanderveldt et al. | 707/10 |
| 6,266,692 B1 | 7/2001 | Greenstein | 709/206 |
| 6,266,700 B1 | 7/2001 | Baker et al. | 709/230 |
| 6,266,774 B1 | 7/2001 | Sampath et al. | 713/201 |
| 6,269,380 B1 | 7/2001 | Terry et al. | 707/200 |
| 6,269,447 B1 | 7/2001 | Maloney et al. | 713/201 |
| 6,269,456 B1 | 7/2001 | Hodges et al. | 714/38 |
| 6,272,532 B1 | 8/2001 | Feinleib | 709/206 |
| 6,272,632 B1 | 8/2001 | Carman et al. | 713/168 |
| 6,275,937 B1 | 8/2001 | Hailpern et al. | 713/188 |
| 6,275,942 B1 | 8/2001 | Bernhard et al. | 713/201 |
| 6,275,977 B1 | 8/2001 | Nagai et al. | 717/1 |
| 6,279,113 B1 | 8/2001 | Vaidya | 713/201 |
| 6,279,133 B1 | 8/2001 | Vafai et al. | 714/763 |
| 6,282,565 B1 | 8/2001 | Shaw et al. | 709/206 |
| 6,285,991 B1 | 9/2001 | Powar | 705/76 |
| 6,289,214 B1 | 9/2001 | Backstrom | 455/422 |
| 6,292,833 B1 | 9/2001 | Liao et al. | 709/229 |

| Patent No. | Date | Inventor | Class |
|---|---|---|---|
| 6,298,445 B1 | 10/2001 | Shostack et al. | 713/201 |
| 6,301,668 B1 | 10/2001 | Gleichauf et al. | 713/201 |
| 6,301,699 B1 | 10/2001 | Hollander et al. | 717/4 |
| 6,304,898 B1 | 10/2001 | Shiigi | 709/206 |
| 6,304,904 B1 | 10/2001 | Sathyanarayan et al. | 709/224 |
| 6,304,973 B1 | 10/2001 | Williams | 713/201 |
| 6,311,207 B1 | 10/2001 | Mighdoll et al. | 709/203 |
| 6,311,273 B1 | 10/2001 | Helbig et al. | 726/2 |
| 6,314,190 B1 | 11/2001 | Zimmermann | 380/282 |
| 6,317,829 B1 | 11/2001 | Van Oorschot | 713/155 |
| 6,320,948 B1 | 11/2001 | Heilmann et al. | 379/189 |
| 6,321,267 B1 | 11/2001 | Donaldson | 709/229 |
| 6,324,569 B1 | 11/2001 | Ogilvie et al. | 709/206 |
| 6,324,647 B1 | 11/2001 | Bowman-Amuah | 713/201 |
| 6,324,656 B1 | 11/2001 | Gleichauf et al. | 714/37 |
| 6,327,579 B1 | 12/2001 | Crawford | 705/400 |
| 6,327,594 B1 | 12/2001 | Van Huben et al. | 707/200 |
| 6,327,620 B1 | 12/2001 | Tams et al. | 709/224 |
| 6,327,652 B1 | 12/2001 | England et al. | 713/2 |
| 6,330,551 B1 | 12/2001 | Burchetta et al. | 705/80 |
| 6,330,589 B1 | 12/2001 | Kennedy | 709/206 |
| 6,330,670 B1 | 12/2001 | England et al. | 713/2 |
| 6,332,163 B1 | 12/2001 | Bowman-Amuah | 709/231 |
| 6,338,141 B1 | 1/2002 | Wells | 713/200 |
| 6,341,369 B1 | 1/2002 | Degenaro et al. | 717/1 |
| 6,347,374 B1 | 2/2002 | Drake et al. | 713/200 |
| 6,347,375 B1 | 2/2002 | Reinert et al. | 713/200 |
| 6,353,886 B1 | 3/2002 | Howard et al. | 713/156 |
| 6,356,859 B1 | 3/2002 | Talbot et al. | 702/188 |
| 6,356,935 B1 * | 3/2002 | Gibbs | 709/206 |
| 6,357,008 B1 | 3/2002 | Nachenberg | 714/38 |
| 6,362,836 B1 | 3/2002 | Shaw et al. | 345/744 |
| 6,363,489 B1 | 3/2002 | Comay et al. | 713/201 |
| 6,367,009 B1 | 4/2002 | Davis et al. | 713/166 |
| 6,367,012 B1 | 4/2002 | Atkinson et al. | 713/176 |
| 6,370,648 B1 | 4/2002 | Diep | 713/201 |
| 6,373,950 B1 | 4/2002 | Rowney | 380/255 |
| 6,381,694 B1 | 4/2002 | Yen | 713/2 |
| 6,385,596 B1 | 5/2002 | Wiser et al. | 705/51 |
| 6,385,655 B1 | 5/2002 | Smith et al. | 709/232 |
| 6,389,419 B1 | 5/2002 | Wong et al. | 709/245 |
| 6,393,465 B2 | 5/2002 | Leeds | 709/207 |
| 6,393,568 B1 | 5/2002 | Ranger et al. | 713/188 |
| 6,397,259 B1 | 5/2002 | Lincke et al. | |
| 6,397,335 B1 | 5/2002 | Franczek et al. | 713/200 |
| 6,400,804 B1 | 6/2002 | Bilder | 379/76 |
| 6,401,210 B1 | 6/2002 | Templeton | 713/200 |
| 6,405,318 B1 | 6/2002 | Rowland | 713/200 |
| 6,411,716 B1 | 6/2002 | Brickell | 380/286 |
| 6,424,650 B1 | 7/2002 | Yang et al. | |
| 6,430,184 B1 | 8/2002 | Robins et al. | |
| 6,430,688 B1 | 8/2002 | Kohl et al. | 713/156 |
| 6,434,536 B1 | 8/2002 | Geiger | 705/37 |
| 6,438,549 B1 | 8/2002 | Aldred et al. | 707/9 |
| 6,438,576 B1 | 8/2002 | Huang et al. | 709/202 |
| 6,438,612 B1 | 8/2002 | Yionen | |
| 6,442,588 B1 | 8/2002 | Clark et al. | 709/203 |
| 6,442,686 B1 | 8/2002 | McArdle et al. | 713/151 |
| 6,442,688 B1 | 8/2002 | Moses et al. | 713/158 |
| 6,442,689 B1 | 8/2002 | Kocher | 713/158 |
| 6,446,109 B2 | 9/2002 | Gupta | 709/203 |
| 6,449,367 B2 | 9/2002 | Van Wie et al. | 380/201 |
| 6,449,640 B1 | 9/2002 | Haverstock et al. | 709/219 |
| 6,452,613 B1 | 9/2002 | Lefebvre et al. | 345/733 |
| 6,453,345 B2 | 9/2002 | Trcka et al. | 709/224 |
| 6,453,352 B1 | 9/2002 | Wagner et al. | 709/229 |
| 6,453,419 B1 | 9/2002 | Flint et al. | 713/201 |
| 6,460,050 B1 * | 10/2002 | Pace et al. | 1/1 |
| 6,460,141 B1 | 10/2002 | Olden | 713/201 |
| 6,469,969 B2 | 10/2002 | Carson et al. | 369/59.12 |
| 6,470,086 B1 | 10/2002 | Smith | 380/255 |
| 6,477,651 B1 | 11/2002 | Teal | 713/201 |
| 6,484,203 B1 | 11/2002 | Porras et al. | 709/224 |
| 6,487,599 B1 | 11/2002 | Smith et al. | 709/229 |
| 6,487,658 B1 | 11/2002 | Micali | 713/158 |
| 6,487,666 B1 | 11/2002 | Shanklin et al. | 713/201 |
| 6,496,974 B1 | 12/2002 | Sliger et al. | 717/106 |
| 6,496,979 B1 | 12/2002 | Chen et al. | 717/178 |
| 6,499,107 B1 | 12/2002 | Gleichauf et al. | 713/201 |
| 6,502,191 B1 | 12/2002 | Smith et al. | 713/201 |
| 6,507,851 B1 | 1/2003 | Fujiwara et al. | 707/104.1 |
| 6,510,431 B1 | 1/2003 | Eichstaedt et al. | 707/10 |
| 6,510,464 B1 | 1/2003 | Grantges, Jr. et al. | 709/225 |
| 6,510,466 B1 | 1/2003 | Cox et al. | 709/229 |
| 6,516,316 B1 | 2/2003 | Ramasubramani et al. | 707/9 |
| 6,516,411 B2 | 2/2003 | Smith | 713/153 |
| 6,519,264 B1 | 2/2003 | Carr et al. | |
| 6,519,703 B1 | 2/2003 | Joyce | 713/201 |
| 6,526,171 B1 | 2/2003 | Furukawa | 382/232 |
| 6,529,498 B1 | 3/2003 | Cheng | 370/351 |
| 6,539,430 B1 | 3/2003 | Humes | 709/225 |
| 6,546,416 B1 | 4/2003 | Kirsch | 709/206 |
| 6,546,493 B1 | 4/2003 | Magdych et al. | 713/201 |
| 6,550,012 B1 | 4/2003 | Villa et al. | 713/201 |
| 6,560,632 B1 | 5/2003 | Chess et al. | 709/201 |
| 6,574,611 B1 * | 6/2003 | Matsuyama et al. | 705/57 |
| 6,574,737 B1 | 6/2003 | Kingsford et al. | 713/201 |
| 6,577,920 B1 | 6/2003 | Hypponen et al. | 700/200 |
| 6,578,025 B1 | 6/2003 | Pollack et al. | 707/2 |
| 6,578,147 B1 | 6/2003 | Shanklin et al. | 713/200 |
| 6,584,488 B1 | 6/2003 | Brenner et al. | 709/103 |
| 6,584,564 B2 * | 6/2003 | Olkin et al. | 713/152 |
| 6,587,949 B1 | 7/2003 | Steinberg | 713/193 |
| 6,606,708 B1 | 8/2003 | Devine et al. | 713/201 |
| 6,609,196 B1 | 8/2003 | Dickinson, III et al. | 713/154 |
| 6,609,205 B1 | 8/2003 | Bernhard et al. | 713/201 |
| 6,611,869 B1 | 8/2003 | Eschelbeck et al. | 709/228 |
| 6,611,925 B1 | 8/2003 | Spear | 714/38 |
| 6,615,242 B1 | 9/2003 | Riemers | 709/206 |
| 6,622,150 B1 | 9/2003 | Kouznetsov et al. | 707/200 |
| 6,647,400 B1 | 11/2003 | Moran | 707/205 |
| 6,650,890 B1 | 11/2003 | Irlam et al. | 455/412.1 |
| 6,654,787 B1 | 11/2003 | Aronson et al. | 709/206 |
| 6,658,568 B1 | 12/2003 | Ginter et al. | 713/193 |
| 6,662,230 B1 | 12/2003 | Eichstaedt et al. | |
| 6,668,269 B1 | 12/2003 | Kamada et al. | 709/103 |
| 6,675,153 B1 | 1/2004 | Cook et al. | 705/74 |
| 6,675,209 B1 | 1/2004 | Britt | 709/224 |
| 6,678,270 B1 | 1/2004 | Garfinkel | 370/392 |
| 6,681,331 B1 | 1/2004 | Munson et al. | 713/201 |
| 6,684,335 B1 | 1/2004 | Epstein, III et al. | 713/201 |
| 6,687,687 B1 | 2/2004 | Smadja | 707/2 |
| 6,687,732 B1 | 2/2004 | Bector et al. | 709/200 |
| 6,691,156 B1 | 2/2004 | Drummond et al. | 709/206 |
| 6,694,023 B1 | 2/2004 | Kim | 380/203 |
| 6,697,950 B1 | 2/2004 | Ko | 713/201 |
| 6,701,440 B1 | 3/2004 | Kim et al. | 713/201 |
| 6,704,874 B1 | 3/2004 | Porras et al. | 713/201 |
| 6,707,915 B1 | 3/2004 | Jobst et al. | 380/247 |
| 6,711,127 B1 | 3/2004 | Gorman et al. | 370/230 |
| 6,711,679 B1 | 3/2004 | Guski et al. | 713/156 |
| 6,715,082 B1 | 3/2004 | Chang et al. | 713/201 |
| 6,721,721 B1 | 4/2004 | Bates et al. | 707/1 |
| 6,725,223 B2 | 4/2004 | Abdo et al. | 1/1 |
| 6,725,377 B1 | 4/2004 | Kouznetsov | 713/201 |
| 6,728,886 B1 | 4/2004 | Ji et al. | 713/201 |
| 6,731,756 B1 | 5/2004 | Pizano et al. | 380/201 |
| 6,732,101 B1 | 5/2004 | Cook | 707/10 |
| 6,732,149 B1 | 5/2004 | Kephart | 709/206 |
| 6,732,157 B1 | 5/2004 | Gordon et al. | 709/206 |
| 6,735,700 B1 | 5/2004 | Flint et al. | 713/200 |
| 6,735,703 B1 | 5/2004 | Kilpatrick et al. | 713/201 |
| 6,738,462 B1 | 5/2004 | Brunson | 379/142.06 |
| 6,738,814 B1 | 5/2004 | Cox et al. | |
| 6,738,932 B1 | 5/2004 | Price | 714/38 |
| 6,741,595 B2 | 5/2004 | Maher, III et al. | |
| 6,742,015 B1 | 5/2004 | Bowman-Amuah | 709/101 |
| 6,742,124 B1 | 5/2004 | Kilpatrick et al. | 713/200 |
| 6,742,128 B1 | 5/2004 | Joiner | 713/201 |
| 6,745,192 B1 | 6/2004 | Libenzi | 707/100 |
| 6,748,531 B1 | 6/2004 | Epstein | 713/158 |
| 6,754,705 B2 | 6/2004 | Joiner et al. | 709/224 |
| 6,757,830 B1 | 6/2004 | Tarbotton et al. | 713/188 |
| 6,760,765 B1 | 7/2004 | Asai et al. | 709/226 |
| 6,760,845 B1 | 7/2004 | Cafarelli et al. | 713/201 |
| 6,766,450 B2 | 7/2004 | Micali | 713/158 |
| 6,768,991 B2 | 7/2004 | Hearnden | 707/5 |
| 6,769,016 B2 | 7/2004 | Rothwell et al. | 709/206 |

| | | | |
|---|---|---|---|
| 6,772,334 B1 | 8/2004 | Glawitsch ............... 713/153 |
| 6,772,346 B1 | 8/2004 | Chess et al. ............. 713/201 |
| 6,775,657 B1 | 8/2004 | Baker ...................... 706/45 |
| 6,775,704 B1 | 8/2004 | Watson et al. ........... 709/229 |
| 6,779,033 B1 | 8/2004 | Watson et al. ........... 709/227 |
| 6,782,503 B1 | 8/2004 | Dawson |
| 6,785,728 B1 | 8/2004 | Schneider et al. ....... 709/229 |
| 6,785,732 B1 | 8/2004 | Bates et al. .............. 709/232 |
| 6,785,818 B1 | 8/2004 | Sobel et al. .............. 713/200 |
| 6,789,202 B1 | 9/2004 | Ko et al. .................. 713/201 |
| 6,792,546 B1 | 9/2004 | Shanklin et al. ......... 713/201 |
| 6,799,197 B1 | 9/2004 | Shetty et al. ............. 709/203 |
| 6,802,002 B1 | 10/2004 | Corella ..................... 713/175 |
| 6,804,237 B1 | 10/2004 | Luo et al. |
| 6,804,778 B1 | 10/2004 | Levi et al. ................ 713/176 |
| 6,804,783 B1 | 10/2004 | Wesinger, Jr. et al. ... 713/200 |
| 6,826,698 B1 | 11/2004 | Minkin et al. ............ 713/201 |
| 6,842,860 B1 | 1/2005 | Branstad et al. ......... 713/170 |
| 6,842,861 B1 | 1/2005 | Cox et al. ................. 713/188 |
| 6,845,449 B1 | 1/2005 | Carman et al. ........... 713/170 |
| 6,847,888 B2 | 1/2005 | Fox et al. ................. 701/208 |
| 6,851,057 B1 | 2/2005 | Nachenberg .............. 713/200 |
| 6,859,793 B1 | 2/2005 | Lambiase ................. 705/59 |
| 6,862,581 B1 | 3/2005 | Lambiase ................. 705/51 |
| 6,870,849 B1 | 3/2005 | Callon et al. |
| 6,883,101 B1 | 4/2005 | Fox et al. ................. 713/201 |
| 6,892,178 B1 | 5/2005 | Zacharia ................... 705/10 |
| 6,892,179 B1 | 5/2005 | Zacharia ................... 705/10 |
| 6,892,237 B1 | 5/2005 | Gai et al. .................. 709/224 |
| 6,892,241 B2 | 5/2005 | Kouznetsov et al. ..... 709/229 |
| 6,895,385 B1 | 5/2005 | Zacharia et al. .......... 705/10 |
| 6,895,436 B1 | 5/2005 | Caillau et al. ............ 709/224 |
| 6,907,430 B2 | 6/2005 | Chong et al. ............. 707/100 |
| 6,909,205 B2 | 6/2005 | Corcoran et al. |
| 6,910,134 B1 | 6/2005 | Maher, III et al. ....... 713/200 |
| 6,910,135 B1 | 6/2005 | Grainger .................. 713/201 |
| 6,915,426 B1 | 7/2005 | Carman et al. ........... 713/168 |
| 6,922,776 B2 | 7/2005 | Cook et al. ............... 713/156 |
| 6,928,550 B1 | 8/2005 | Le Pennec et al. ....... 713/200 |
| 6,928,556 B2 | 8/2005 | Black et al. .............. 713/201 |
| 6,934,857 B1 | 8/2005 | Bartleson et al. ........ 713/201 |
| 6,941,348 B2 | 9/2005 | Petry et al. ............... 709/206 |
| 6,941,467 B2 | 9/2005 | Judge et al. .............. 713/200 |
| 6,944,673 B2 | 9/2005 | Malan et al. ............. 709/237 |
| 6,947,442 B1 | 9/2005 | Lato et al. |
| 6,947,936 B1 | 9/2005 | Suermondt et al. ...... 707/7 |
| 6,950,933 B1 | 9/2005 | Cook et al. ............... 713/158 |
| 6,952,776 B1 | 10/2005 | Chess ....................... 713/188 |
| 6,954,775 B1 | 10/2005 | Shanklin et al. ......... 709/105 |
| 6,968,336 B1 | 11/2005 | Gupta ....................... 707/100 |
| 6,968,461 B1 | 11/2005 | Lucas et al. .............. 713/200 |
| 6,971,019 B1 | 11/2005 | Nachenberg .............. 713/188 |
| 6,976,168 B1 | 12/2005 | Branstad et al. ......... 713/175 |
| 6,976,271 B1 | 12/2005 | Le Pennec et al. ....... 726/24 |
| 6,978,223 B2 | 12/2005 | Milliken |
| 6,981,146 B1 | 12/2005 | Sheymov |
| 6,981,158 B1 | 12/2005 | Sanchez et al. .......... 726/2 |
| 6,985,923 B1 * | 1/2006 | Bates et al. .............. 709/206 |
| 6,993,660 B1 | 1/2006 | Libenzi et al. ........... 713/188 |
| 7,010,696 B1 | 3/2006 | Cambridge et al. ...... 713/188 |
| 7,055,173 B1 | 5/2006 | Chaganty et al. ........ 726/11 |
| 7,058,974 B1 | 6/2006 | Maher, III et al. ....... 726/13 |
| 7,080,000 B1 | 7/2006 | Cambridge ............... 703/21 |
| 7,085,934 B1 | 8/2006 | Edwards .................. 713/200 |
| 7,093,002 B2 | 8/2006 | Wolff et al. .............. 709/219 |
| 7,107,618 B1 | 9/2006 | Gordon et al. ........... 726/24 |
| 7,117,358 B2 | 10/2006 | Bandini et al. ........... 713/153 |
| 7,117,533 B1 | 10/2006 | Libenzi .................... 726/24 |
| 7,120,252 B1 | 10/2006 | Jones et al. ............... 380/201 |
| 7,127,743 B1 | 10/2006 | Khanolkar et al. ....... 726/23 |
| 7,134,141 B2 | 11/2006 | Crosbie et al. ........... 726/23 |
| 7,136,487 B1 | 11/2006 | Schon et al. ............. 380/284 |
| 7,150,042 B2 | 12/2006 | Wolff et al. .............. 726/22 |
| 7,159,237 B2 | 1/2007 | Schneier et al. ......... 726/3 |
| 7,181,015 B2 | 2/2007 | Matt ......................... 380/279 |
| 7,181,768 B1 | 2/2007 | Ghosh et al. ............. 726/23 |
| 7,213,260 B2 | 5/2007 | Judge ....................... 726/3 |
| 7,222,157 B1 | 5/2007 | Sutton et al. ............. 709/206 |
| 7,225,255 B2 | 5/2007 | Favier et al. ............. 709/225 |
| 7,225,466 B2 | 5/2007 | Judge ....................... 726/22 |
| 7,234,168 B2 | 6/2007 | Gupta et al. .............. 726/25 |
| 7,308,715 B2 | 12/2007 | Gupta et al. .............. 726/23 |
| 7,310,818 B1 | 12/2007 | Parish et al. ............. 726/24 |
| 7,328,349 B2 | 2/2008 | Milliken ................... 713/181 |
| 7,366,764 B1 * | 4/2008 | Vollebregt ................ 709/207 |
| 7,409,714 B2 | 8/2008 | Gupta et al. .............. 726/23 |
| 7,458,098 B2 | 11/2008 | Judge et al. .............. 726/23 |
| 7,519,994 B2 | 4/2009 | Judge et al. .............. 726/22 |
| 7,533,272 B1 | 5/2009 | Gordon et al. ........... 713/188 |
| 7,624,274 B1 * | 11/2009 | Alspector et al. ........ 713/176 |
| 7,660,865 B2 | 2/2010 | Hulten et al. ............. 709/207 |
| 7,693,945 B1 * | 4/2010 | Dulitz et al. ............. 709/206 |
| 2001/0005889 A1 | 6/2001 | Albrecht .................. 713/201 |
| 2001/0009580 A1 | 7/2001 | Ikeda ....................... 380/201 |
| 2001/0011308 A1 | 8/2001 | Clark et al. ............... 710/20 |
| 2001/0034839 A1 | 10/2001 | Karjoth et al. ........... 713/190 |
| 2001/0039579 A1 | 11/2001 | Trcka et al. .............. 709/224 |
| 2001/0049793 A1 | 12/2001 | Sugimoto ................. 713/200 |
| 2002/0001384 A1 | 1/2002 | Buer et al. |
| 2002/0004902 A1 | 1/2002 | Toh et al. ................. 713/170 |
| 2002/0016826 A1 | 2/2002 | Johansson et al. ....... 709/207 |
| 2002/0016910 A1 | 2/2002 | Wright et al. ............ 713/150 |
| 2002/0019945 A1 | 2/2002 | Houston et al. .......... 713/201 |
| 2002/0023140 A1 | 2/2002 | Hile et al. ................. 709/217 |
| 2002/0026591 A1 | 2/2002 | Hartley et al. ............ 713/201 |
| 2002/0032860 A1 | 3/2002 | Wheeler et al. .......... 713/170 |
| 2002/0032871 A1 | 3/2002 | Malan et al. ............. 713/201 |
| 2002/0035683 A1 | 3/2002 | Kaashoek et al. ........ 713/154 |
| 2002/0038339 A1 | 3/2002 | Xu ............................ 709/203 |
| 2002/0042876 A1 | 4/2002 | Smith ....................... 713/153 |
| 2002/0042877 A1 | 4/2002 | Wheeler et al. .......... 713/155 |
| 2002/0046041 A1 | 4/2002 | Lang ......................... 705/1 |
| 2002/0049853 A1 | 4/2002 | Chu et al. ................. 709/237 |
| 2002/0069263 A1 | 6/2002 | Sears et al. ............... 709/218 |
| 2002/0071438 A1 | 6/2002 | Singh |
| 2002/0078381 A1 | 6/2002 | Farley et al. ............. 713/201 |
| 2002/0078382 A1 | 6/2002 | Sheikh et al. ............ 713/201 |
| 2002/0080888 A1 | 6/2002 | Shu et al. ................. 375/295 |
| 2002/0083033 A1 | 6/2002 | Abdo et al. .............. 707/1 |
| 2002/0083342 A1 | 6/2002 | Webb et al. .............. 713/201 |
| 2002/0083343 A1 | 6/2002 | Crosbie et al. ........... 713/201 |
| 2002/0087882 A1 | 7/2002 | Schneier et al. ......... 713/201 |
| 2002/0091697 A1 | 7/2002 | Huang et al. ............. 707/10 |
| 2002/0091757 A1 | 7/2002 | Cuomo et al. ........... 709/203 |
| 2002/0095492 A1 | 7/2002 | Kaashoek et al. ........ 709/224 |
| 2002/0107853 A1 | 8/2002 | Hofmann et al. ........ 707/7 |
| 2002/0112008 A1 | 8/2002 | Christenson et al. ..... 709/206 |
| 2002/0112168 A1 | 8/2002 | Filipi-Martin et al. ... 713/183 |
| 2002/0112185 A1 | 8/2002 | Hodges .................... 713/201 |
| 2002/0116463 A1 | 8/2002 | Hart ......................... 709/206 |
| 2002/0116627 A1 | 8/2002 | Tarbotton et al. ........ 713/200 |
| 2002/0120705 A1 | 8/2002 | Schiavone et al. ....... 709/207 |
| 2002/0120853 A1 | 8/2002 | Tyree ....................... 713/188 |
| 2002/0120874 A1 | 8/2002 | Shu et al. ................. 713/201 |
| 2002/0129002 A1 | 9/2002 | Alberts et al. ........... 707/1 |
| 2002/0129277 A1 | 9/2002 | Caccavale ................ 713/201 |
| 2002/0133365 A1 | 9/2002 | Grey et al. ............... 705/1 |
| 2002/0133586 A1 | 9/2002 | Shanklin et al. ......... 709/224 |
| 2002/0138416 A1 | 9/2002 | Lovejoy et al. .......... 705/38 |
| 2002/0138755 A1 | 9/2002 | Ko ............................ 713/201 |
| 2002/0138759 A1 | 9/2002 | Dutta ........................ 713/201 |
| 2002/0138762 A1 | 9/2002 | Horne ...................... 713/201 |
| 2002/0143963 A1 | 10/2002 | Converse et al. ........ 709/229 |
| 2002/0147734 A1 | 10/2002 | Shoup et al. ............. 707/200 |
| 2002/0147780 A1 | 10/2002 | Liu et al. .................. 709/206 |
| 2002/0147925 A1 | 10/2002 | Chefalas et al. ......... 713/188 |
| 2002/0147925 A1 | 10/2002 | Lingafelt et al. ......... 713/201 |
| 2002/0152399 A1 * | 10/2002 | Smith ....................... 713/200 |
| 2002/0161718 A1 | 10/2002 | Coley et al. .............. 705/59 |
| 2002/0165971 A1 | 11/2002 | Baron ....................... 709/228 |
| 2002/0169954 A1 | 11/2002 | Bandini et al. ........... 713/153 |
| 2002/0172367 A1 | 11/2002 | Mulder et al. ............ 380/277 |
| 2002/0174358 A1 | 11/2002 | Wolff et al. .............. 713/200 |
| 2002/0178227 A1 | 11/2002 | Matsa et al. .............. 709/206 |
| 2002/0178383 A1 | 11/2002 | Hrabik et al. ............. 713/201 |
| 2002/0181703 A1 | 12/2002 | Logan et al. ............. 380/30 |
| 2002/0186698 A1 | 12/2002 | Ceniza .................... 370/401 |
| 2002/0188864 A1 | 12/2002 | Jackson ................... 713/201 |

| | | | | | | |
|---|---|---|---|---|---|---|
| 2002/0194161 A1 | 12/2002 | McNamee et al. ................ 707/2 | | 2003/0167402 A1* | 9/2003 | Stolfo et al. .................. 713/200 |
| 2002/0194469 A1 | 12/2002 | Dominique et al. .......... 713/150 | | 2003/0172120 A1 | 9/2003 | Tomkow et al. .............. 709/206 |
| 2002/0194490 A1 | 12/2002 | Halperin et al. ............... 713/200 | | 2003/0172166 A1 | 9/2003 | Judge et al. .................. 709/229 |
| 2002/0199095 A1* | 12/2002 | Bandini et al. ................ 713/151 | | 2003/0172167 A1 | 9/2003 | Judge et al. .................. 709/229 |
| 2003/0004688 A1 | 1/2003 | Gupta et al. ................... 702/188 | | 2003/0172289 A1 | 9/2003 | Soppera ......................... 713/200 |
| 2003/0004689 A1 | 1/2003 | Gupta et al. ................... 702/188 | | 2003/0172291 A1 | 9/2003 | Judge et al. .................. 713/200 |
| 2003/0005326 A1 | 1/2003 | Flemming .................... 713/201 | | 2003/0172292 A1 | 9/2003 | Judge ............................ 713/200 |
| 2003/0009554 A1 | 1/2003 | Burch et al. .................. 709/224 | | 2003/0172294 A1 | 9/2003 | Judge ............................ 713/200 |
| 2003/0009693 A1 | 1/2003 | Brock et al. ................... 713/201 | | 2003/0172301 A1 | 9/2003 | Judge et al. .................. 713/201 |
| 2003/0009696 A1 | 1/2003 | Bunker et al. ................. 713/201 | | 2003/0172302 A1 | 9/2003 | Judge et al. .................. 713/201 |
| 2003/0009698 A1* | 1/2003 | Lindeman et al. ............ 713/228 | | 2003/0187996 A1 | 10/2003 | Cardina et al. ............... 709/228 |
| 2003/0009699 A1 | 1/2003 | Gupta et al. ................... 713/201 | | 2003/0212791 A1 | 11/2003 | Pickup .......................... 709/225 |
| 2003/0014662 A1 | 1/2003 | Gupta et al. ................... 713/200 | | 2003/0233328 A1 | 12/2003 | Scott et al. ..................... 705/50 |
| 2003/0014664 A1 | 1/2003 | Hentunen ...................... 713/200 | | 2003/0236845 A1 | 12/2003 | Pitsos ............................ 709/206 |
| 2003/0021280 A1 | 1/2003 | Makinson et al. ............. 370/401 | | 2004/0015554 A1 | 1/2004 | Wilson .......................... 709/206 |
| 2003/0023692 A1 | 1/2003 | Moroo ........................... 709/206 | | 2004/0025044 A1 | 2/2004 | Day ............................... 713/200 |
| 2003/0023695 A1 | 1/2003 | Kobata et al. .................. 709/206 | | 2004/0054886 A1 | 3/2004 | Dickinson, III et al. ...... 713/153 |
| 2003/0023873 A1 | 1/2003 | Ben-Itzhak .................... 713/201 | | 2004/0058673 A1 | 3/2004 | Irlam et al. ................. 455/412.1 |
| 2003/0023874 A1 | 1/2003 | Prokupets et al. ............. 713/201 | | 2004/0059811 A1 | 3/2004 | Sugauchi et al. .............. 709/224 |
| 2003/0023875 A1 | 1/2003 | Hursey et al. ................. 713/201 | | 2004/0083384 A1 | 4/2004 | Hypponen .................... 713/200 |
| 2003/0028803 A1 | 2/2003 | Bunker et al. ................. 713/201 | | 2004/0088570 A1 | 5/2004 | Roberts et al. ................ 713/201 |
| 2003/0033516 A1 | 2/2003 | Howard et al. ................ 713/152 | | 2004/0103315 A1 | 5/2004 | Cooper et al. ................... 726/25 |
| 2003/0033542 A1 | 2/2003 | Goseva-Popstojanova et al. ............................ 713/201 | | 2004/0111531 A1 | 6/2004 | Staniford et al. ............. 709/246 |
| | | | | 2004/0139160 A1 | 7/2004 | Wallace et al. ............... 709/206 |
| 2003/0037141 A1 | 2/2003 | Milo et al. .................... 709/225 | | 2004/0139334 A1 | 7/2004 | Wiseman ...................... 713/188 |
| 2003/0041263 A1 | 2/2003 | Devine et al. ................. 713/201 | | 2004/0143763 A1 | 7/2004 | Radatti ......................... 713/201 |
| 2003/0041264 A1 | 2/2003 | Black et al. ................... 713/201 | | 2004/0167968 A1 | 8/2004 | Wilson et al. ................ 709/207 |
| 2003/0046421 A1 | 3/2003 | Horvitz et al. ................ 709/238 | | 2004/0177120 A1 | 9/2004 | Kirsch ........................... 709/206 |
| 2003/0051026 A1 | 3/2003 | Carter et al. ................... 709/224 | | 2004/0181462 A1 | 9/2004 | Bauer et al. ..................... 705/26 |
| 2003/0051163 A1 | 3/2003 | Bidaud .......................... 713/201 | | 2004/0191462 A1 | 9/2004 | Hosoda et al. .................. 428/64 |
| 2003/0051168 A1 | 3/2003 | King et al. .................... 713/201 | | 2004/0193482 A1 | 9/2004 | Hoffman et al. ................ 705/14 |
| 2003/0055931 A1 | 3/2003 | Cravo De Almeida et al. ............................ 709/223 | | 2004/0203589 A1 | 10/2004 | Wang et al. .................. 455/410 |
| | | | | 2004/0205135 A1 | 10/2004 | Hallam-Baker .............. 709/206 |
| 2003/0061502 A1 | 3/2003 | Teblyashkin et al. | | 2004/0236884 A1 | 11/2004 | Beetz ............................ 710/68 |
| 2003/0061506 A1 | 3/2003 | Cooper et al. ................. 713/201 | | 2004/0267893 A1 | 12/2004 | Lin ................................ 709/207 |
| 2003/0065791 A1 | 4/2003 | Garg et al. ..................... 709/229 | | 2005/0014749 A1 | 1/2005 | Chen et al. |
| 2003/0065943 A1 | 4/2003 | Geis et al. ..................... 713/201 | | 2005/0021738 A1 | 1/2005 | Goeller et al. ................ 709/224 |
| 2003/0084020 A1 | 5/2003 | Shu ................................. 707/1 | | 2005/0043936 A1* | 2/2005 | Corston-Oliver et al. ......... 704/4 |
| 2003/0084280 A1 | 5/2003 | Bryan et al. ................... 713/153 | | 2005/0052998 A1 | 3/2005 | Oliver et al. .................. 370/231 |
| 2003/0084320 A1 | 5/2003 | Tarquini et al. ............... 713/200 | | 2005/0058129 A1 | 3/2005 | Jones et al. |
| 2003/0084323 A1 | 5/2003 | Gales ............................. 713/200 | | 2005/0065810 A1 | 3/2005 | Bouron ........................... 705/1 |
| 2003/0084347 A1 | 5/2003 | Luzzatto ........................ 713/201 | | 2005/0081059 A1 | 4/2005 | Bandini et al. ................ 713/201 |
| 2003/0088680 A1 | 5/2003 | Nachenberg et al. .......... 709/229 | | 2005/0086526 A1 | 4/2005 | Aguirre ......................... 713/201 |
| 2003/0088792 A1 | 5/2003 | Card et al. ..................... 713/201 | | 2005/0102366 A1 | 5/2005 | Kirsch ........................... 709/207 |
| 2003/0093667 A1 | 5/2003 | Dutta et al. .................... 713/161 | | 2005/0188045 A1 | 8/2005 | Katsikas ........................ 709/206 |
| 2003/0093695 A1 | 5/2003 | Dutta ............................. 713/201 | | 2005/0204159 A1* | 9/2005 | Davis et al. ................... 713/201 |
| 2003/0093696 A1 | 5/2003 | Sugimoto ...................... 713/201 | | 2005/0235360 A1 | 10/2005 | Pearson ........................... 726/23 |
| 2003/0095555 A1 | 5/2003 | McNamara et al. ........... 370/401 | | 2005/0262209 A1 | 11/2005 | Yu .................................. 709/206 |
| 2003/0097439 A1 | 5/2003 | Strayer et al. ................. 709/224 | | 2005/0262210 A1 | 11/2005 | Yu .................................. 709/206 |
| 2003/0097564 A1 | 5/2003 | Tewari et al. ................. 713/171 | | 2006/0036693 A1 | 2/2006 | Hulten et al. ................. 709/206 |
| 2003/0101381 A1 | 5/2003 | Mateev et al. .................. 714/38 | | 2006/0036727 A1 | 2/2006 | Kurapati et al. .............. 709/224 |
| 2003/0105827 A1 | 6/2003 | Tan et al. ....................... 709/206 | | 2006/0042483 A1 | 3/2006 | Work et al. ...................... 101/91 |
| 2003/0105859 A1 | 6/2003 | Garnett et al. ................. 709/224 | | 2006/0047794 A1 | 3/2006 | Jezierski ....................... 709/221 |
| 2003/0105976 A1 | 6/2003 | Copeland, III ................ 713/201 | | 2006/0095404 A1 | 5/2006 | Adelman et al. ................. 707/3 |
| 2003/0110392 A1 | 6/2003 | Aucsmith et al. ............. 713/200 | | 2006/0095966 A1* | 5/2006 | Park ................................ 726/22 |
| 2003/0110393 A1 | 6/2003 | Brock et al. | | 2006/0123083 A1 | 6/2006 | Goutte et al. ................. 709/206 |
| 2003/0110396 A1 | 6/2003 | Lewis et al. ................... 713/201 | | 2006/0149820 A1 | 7/2006 | Rajan et al. ................... 709/206 |
| 2003/0115485 A1 | 6/2003 | Milliken ....................... 713/201 | | 2006/0168006 A1* | 7/2006 | Shannon et al. .............. 709/206 |
| 2003/0115486 A1 | 6/2003 | Choi et al. ..................... 713/201 | | 2006/0168017 A1* | 7/2006 | Stern et al. ................... 709/206 |
| 2003/0120604 A1 | 6/2003 | Yokota et al. .................. 705/57 | | 2006/0212925 A1 | 9/2006 | Shull et al. ...................... 726/1 |
| 2003/0120647 A1 | 6/2003 | Aiken et al. ..................... 707/2 | | 2006/0212930 A1 | 9/2006 | Shull et al. ..................... 726/10 |
| 2003/0123665 A1 | 7/2003 | Dunstan et al. ............... 380/255 | | 2006/0212931 A1 | 9/2006 | Shull et al. ..................... 726/10 |
| 2003/0126464 A1 | 7/2003 | McDaniel et al. ............. 713/201 | | 2006/0230039 A1 | 10/2006 | Shull et al. ....................... 707/6 |
| 2003/0126472 A1 | 7/2003 | Banzhof ........................ 713/201 | | 2006/0253458 A1 | 11/2006 | Dixon et al. .................... 707/10 |
| 2003/0135749 A1 | 7/2003 | Gales et al. .................... 713/200 | | 2006/0259551 A1* | 11/2006 | Caldwell, Jr. ................. 709/204 |
| 2003/0140137 A1 | 7/2003 | Joiner et al. ................... 709/224 | | 2008/0060075 A1 | 3/2008 | Cox et al. ....................... 726/24 |
| 2003/0140250 A1 | 7/2003 | Taninaka et al. .............. 713/201 | | 2009/0064329 A1* | 3/2009 | Okumura et al. .............. 726/22 |
| 2003/0145212 A1 | 7/2003 | Crumly ......................... 713/186 | | 2009/0083413 A1* | 3/2009 | Levow et al. ................. 709/224 |
| 2003/0145225 A1 | 7/2003 | Bruton, III et al. ............ 713/201 | | 2010/0017487 A1* | 1/2010 | Patinkin ........................ 709/206 |
| 2003/0145226 A1 | 7/2003 | Bruton, III et al. ............ 713/201 | | 2010/0049848 A1* | 2/2010 | Levow et al. ................. 709/224 |
| 2003/0145232 A1 | 7/2003 | Poletto et al. | | 2010/0145900 A1 | 6/2010 | Zheng et al. .................. 706/52 |
| 2003/0149887 A1 | 8/2003 | Yadav ........................... 713/200 | | | | |
| 2003/0149888 A1 | 8/2003 | Yadav ........................... 713/200 | | | | |
| 2003/0154393 A1 | 8/2003 | Young ........................... 713/200 | | FOREIGN PATENT DOCUMENTS | | |
| 2003/0154399 A1 | 8/2003 | Zuk et al. ...................... 713/201 | | | | |
| 2003/0154402 A1 | 8/2003 | Pandit et al. .................. 713/201 | | WO | WO0028420 | 5/2000 |
| 2003/0158905 A1 | 8/2003 | Petry et al. .................... 709/206 | | WO | WO0155927 | 8/2001 |
| 2003/0159069 A1 | 8/2003 | Choi et al. ..................... 713/201 | | WO | WO0173523 | 10/2001 |
| 2003/0159070 A1 | 8/2003 | Mayer et al. .................. 713/201 | | WO | WO02101516 | 12/2002 |

OTHER PUBLICATIONS

Paul Vixie; Distributed Checksom Clearinghouse; Rhyolite Software; http://www.rhyolite.com/anti-spam/dcc-tree/dcc.html; Aug. 26, 2002.

S. Staniford-Chen, and L. Todd Herberlein; "Holding Intruders Accountable on the Internet"; Proceedings of the 1995 IEEE Symposium on Security and Privacy; Oakland, CA pp. 39-49, May 8-10, 1995.

RFC #2231; N. Freed, et al; MIME Parameter Value and Encoded Word Extensions: character Sets, Languages, and Continuations; Nov. 1997; pp. 1-10.

RFC #2045; N. Freed, et al; Multipurpose Internet Mail Extensions (MIME) Part One: Format of Internet Message Bodies; Nov. 1996; pp. 1-29.

RFC #2046; N. Freed, et al; Multipurpose Internet Mail Extensions (MIME) Part Two: Media Types; Nov. 1996; pp. 1-19.

RFC #2047; K. Moore; MIME (Multipurpose Internet Mail Extensions) Part Three: Message Header Extensions for Non-ASCII Text); Nov. 1996; pp. 1-15.

RFC #2048; N. Freed, et al; Multipurpose Internet Mail Extensions (MIME) Part Four: Registration Procedures; Nov. 1996; pp. 1-15.

RFC #2049; N. Freed, et al; Multipurpose Internet Mail Extensions (MIME) Part Five: Conformance Criteria and Examples; Nov. 1996; pp. 1-23.

Skipper, Chad, "Polymorphism and IDS," Symantec, (2001).

Savage, et al., "Practical Network Support for IP Traceback," Department of Computer Science and Engineering, University of Washington, (2000).

RFC #1123; R. Braden; Requirements for Internet Hosts—Application and Support; Oct. 1989; pp. 1-97.

Schwartz, et al., "Smart Packets: Applying Active Networks to Network Management," ACM Transactions on Computer Systems, 18(1):67-88, (2000).

Crocker, D., "Standard for the Format of ARPA Internet Text messages," Department of Electrical Engineering, University of Deleware, Newark, DE, pp. 1-49, (1982).

Todd Heberlein; "Worm Detection and Prevention: Concept, Approach, and Experience"; Net Squared, Inc.; http://www.attackcenter.com/information/WhitePapers/WormDetect/; Aug. 14, 2002; pp. 1-7.

International Search Report for PCT/US2004/028896 mailed on Dec. 13, 2004.

Bace, Rebecca Gurley, "Intrusion Detection—Technology Series" —Copyright 2000 by MacMillan Technical Publishing.

Amoroso, Edward G., "Intrusion Detection—An Introduction to Surveillance, Correlation, Traps, Trace Back, and Response." AT&T Laboratories, First Edition.—Copyright 1999 by AT&T, Inc.

Jackson, Kathleen, DuBois, David H., and Stallings, Cathy A., "A Phased Approach to Network Intrusion Detection," 14th National Computing Security Conference, 1991.

Paxson, Vern, "Bro: A System for Detecting Network Intruders in Real-Time," Proceedings of The 7th USENIX Security Symposium, San Antonio, TX, 1998.

Snapp, Steven R, Brentano, James, Dias, Gihan V., Goan, Terrance L., Heberlein, L. Todd, Ho, Che-Lin, Levitt, Karl N., Mukherjee, Biswanath, Smaha, Stephen E., Grance, Tim, Teal, Daniel M. and Mansur, Doug, "DIDS (Distributed Intrusion Detection System)—Motivation, Architecture, and An Early Prototype," The 14th National Computer Security Conference, Oct. 1991, pp. 167-176.

Office Action Summary from U.S. Appl. No. 10/654,771 mailed on Dec. 11, 2008.

Office Action Summary from U.S. Appl. No. 10/654,771 mailed on Jul. 22, 2010.

Office Action Summary from U.S. Appl. No. 10/654,771 mailed on Jan. 13, 2011.

Office Action Summary from U.S. Appl. No. 12/249,803 mailed on Oct. 19, 2010.

Office Action Summary from U.S. Appl. No. 12/249,804 mailed on Aug. 30, 2010.

Office Action Summary from U.S. Appl. No. 12/249,832 mailed on Oct. 12, 2010.

Office Action Summary from U.S. Appl. No. 12/243,778 mailed on Oct. 7, 2010.

Office Action Summary from U.S. Appl. No. 12/243,785 mailed on Sep. 1, 2010.

Office Action Summary from U.S. Appl. No. 12/249,803 mailed on Mar. 10, 2011.

Office Action Summary from U.S. Appl. No. 12/249,823 mailed on Dec. 1, 2010.

Office Action Summary from U.S. Appl. No. 12/762,365 mailed on Dec. 14, 2010.

Office Action Summary from U.S. Appl. No. 12/762,366 mailed on Nov. 10, 2010.

Office Action Summary from U.S. Appl. No. 09/881,145 mailed on Apr. 20, 2005.

Office Action Summary from U.S. Appl. No. 09/881,145 mailed on Jul. 18, 2006.

Office Action Summary from U.S. Appl. No. 09/881,145 mailed on Nov. 30, 2006.

Office Action Summary from U.S. Appl. No. 09/881,145 mailed on Aug. 16, 2007.

Office Action Summary from U.S. Appl. No. 10/251,403 mailed on Apr. 25, 2006.

Office Action Summary from U.S. Appl. No. 10/251,403 mailed on Dec. 8, 2006.

Notice of Allowance from U.S. Appl. No. 10/251,403 mailed on Aug. 10, 2007.

Notice of Allowance from U.S. Appl. No. 09/881,074 mailed on Jan. 6, 2005.

Office Action from U.S. Appl. No. 12/243,785 which was mailed on Mar. 30, 2011.

Office Action from U.S. Appl. No. 12/249,804 which was mailed on Apr. 20, 2011.

Office Action from U.S. Appl. No. 12/762,367which was mailed on Jul. 14, 2011.

Office Action from U.S. Appl. No. 12/762,368 which was mailed on Oct. 13, 2011.

Notice of Allowance from U.S. Appl. No. 12/762,367 which was mailed on Dec. 14, 2011.

Office Action from U.S. Appl. No. 12/762,368 which was mailed on Feb. 23, 2012.

US 5,373,559, 12/1994, Kaufman et al. (withdrawn)

\* cited by examiner

HASH-BASED SYSTEMS AND METHODS FOR DETECTING AND PREVENTING TRANSMISSION OF UNWANTED E-MAIL

RELATED APPLICATIONS

This application is a continuation of U.S. patent application Ser. No. 10/654,771, filed Sep. 4, 2003, which, in turn, claims priority under 35 U.S.C. §119 based on U.S. Provisional Application No. 60/407,975, filed Sep. 5, 2002, both of which are incorporated herein by reference. U.S. patent application Ser. No. 10/654,771 is also a continuation-in-part of U.S. patent application Ser. No. 10/251,403, filed Sep. 20, 2002, now U.S. Pat. No. 7,328,349 which claims priority under 35 U.S.C. §119 based on U.S. Provisional Application No. 60/341,462, filed Dec. 14, 2001, both of which are incorporated herein by reference. U.S. patent application Ser. No. 10/654,771 is also a continuation-in-part of U.S. patent application Ser. No. 09/881,145 now abandoned, and U.S. patent application Ser. No. 09/881,074, now U.S. Pat. No. 6,981,158 both of which were filed on Jun. 14, 2001, and both of which claim priority under 35 U.S.C. §119 based on U.S. Provisional Application No. 60/212,425, filed Jun. 19, 2000, all of which are incorporated herein by reference.

BACKGROUND OF THE INVENTION

1. Field of the Invention

The present invention relates generally to network security and, more particularly, to systems and methods for detecting and/or preventing the transmission of unwanted e-mails, such as e-mails containing worms and viruses, including polymorphic worms and viruses, and unsolicited commercial e-mails.

2. Description of Related Art

Availability of low cost computers, high speed networking products, and readily available network connections has helped fuel the proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with the rapid growth of the Internet have come problems arising from attacks from within the network and the shear volume of commercial e-mail. As the size of the Internet continues to grow, so does the threat posed to users of the Internet.

Many of the problems take the form of e-mail. Viruses and worms often masquerade within e-mail messages for execution by unsuspecting e-mail recipients. Unsolicited commercial e-mail, or "spam," is another burdensome type of e-mail because it wastes both the time and resources of the e-mail recipient.

Existing techniques for detecting viruses, worms, and spam examine each e-mail message individually. In the case of viruses and worms, this typically means examining attachments for byte-strings found in known viruses and worms (possibly after uncompressing or de-archiving attached files), or simulating execution of the attachment in a "safe" compartment and examining its behaviors. Similarly, existing spam filters usually examine a single e-mail message looking for heuristic traits commonly found in unsolicited commercial e-mail, such as an abundance of Uniform Resource Locators (URLs), heavy use of all-capital-letter words, use of colored text or large fonts, and the like, and then "score" the message based on the number and types of such traits found. Both the anti-virus and the anti-spam techniques can demand significant processing of each message, adding to the resource burden imposed by unwanted e-mail. Neither technique makes use of information collected from other recent messages.

Thus, there is need for an efficient technique that can quickly detect viruses, worms, and spam in e-mail messages arriving at e-mail servers, possibly by using information contained in multiple recent messages to detect unwanted mail more quickly and efficiently.

SUMMARY OF THE INVENTION

Systems and methods consistent with the present invention address this and other needs by providing a new defense that detects and prevents the transmission of unwanted (and potentially unwanted) e-mail, such as e-mails containing viruses, worms, and spam.

In accordance with an aspect of the invention as embodied and broadly described herein, a method for detecting transmission of potentially unwanted e-mail messages is provided. The method includes receiving e-mail messages and generating hash values based on one or more portions of the e-mail messages. The method further includes determining whether the generated hash values match hash values associated with prior e-mail messages. The method may also include determining that one of the e-mail messages is a potentially unwanted e-mail message when one or more of the generated hash values associated with the e-mail message match one or more of the hash values associated with the prior e-mail messages.

In accordance with another aspect of the invention, a mail server includes one or more hash memories and a hash processor. The one or more hash memories is/are configured to store count values associated with hash values. The hash processor is configured to receive an e-mail message, hash one or more portions of the e-mail message to generate hash values, and increment the count values corresponding to the generated hash values. The hash processor is further configured to determine whether the e-mail message is a potentially unwanted e-mail message based on the incremented count values.

In accordance with yet another aspect of the invention, a method for detecting transmission of unwanted e-mail messages is provided. The method includes receiving e-mail messages and detecting unwanted e-mail messages of the received e-mail messages based on hashes of previously received e-mail messages, where multiple hashes are performed on each of the e-mail messages.

In accordance with a further aspect of the invention, a method for detecting transmission of potentially unwanted e-mail messages is provided. The method includes receiving an e-mail message; generating hash values over blocks of the e-mail message, where the blocks include at least two of a main text portion, an attachment portion, and a header portion of the e-mail message; determining whether the generated hash values match hash values associated with prior e-mail messages; and determining that the e-mail message is a potentially unwanted e-mail message when one or more of the generated hash values associated with the e-mail message match one or more of the hash values associated with the prior e-mail messages.

In accordance with another aspect of the invention, a mail server in a network of cooperating mail servers is provided. The mail server includes one or more hash memories and a hash processor. The one or more hash memories is/are configured to store information relating to hash values corresponding to previously-observed e-mails. The hash processor is configured to receive at least some of the hash values from another one or more of the cooperating mail servers and store information relating to the at least some of the hash values in at least one of the one or more hash memories. The hash processor is further configured to receive an e-mail message, hash one or more portions of the received e-mail message to generate hash values, determine whether the generated hash values match the hash values corresponding to previously-observed e-mails, and identify the received e-mail message as a potentially unwanted e-mail message when one or more of the generated hash values associated with the received e-mail message match one or more of the hash values corresponding to previously-observed e-mails.

In accordance with yet another aspect of the invention, a mail server is provided. The mail server includes one or more hash memories and a hash processor. The one or more hash memories is/are configured to store count values associated with hash values. The hash processor is configured to receive e-mail messages, hash one or more portions of the received e-mail messages to generate hash values, increment the count values corresponding to the generated hash values, as incremented count values, and generate suspicion scores for the received e-mail messages based on the incremented count values.

In accordance with a further aspect of the invention, a method for preventing transmission of unwanted e-mail messages is provided. The method includes receiving an e-mail message; generating hash values over portions of the e-mail message as the e-mail message is being received; and incrementally determining whether the generated hash values match hash values associated with prior e-mail messages. The method further includes generating a suspicion score for the e-mail message based on the incremental determining; and rejecting the e-mail message when the suspicion score of the e-mail message is above a threshold.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

Figure 1:
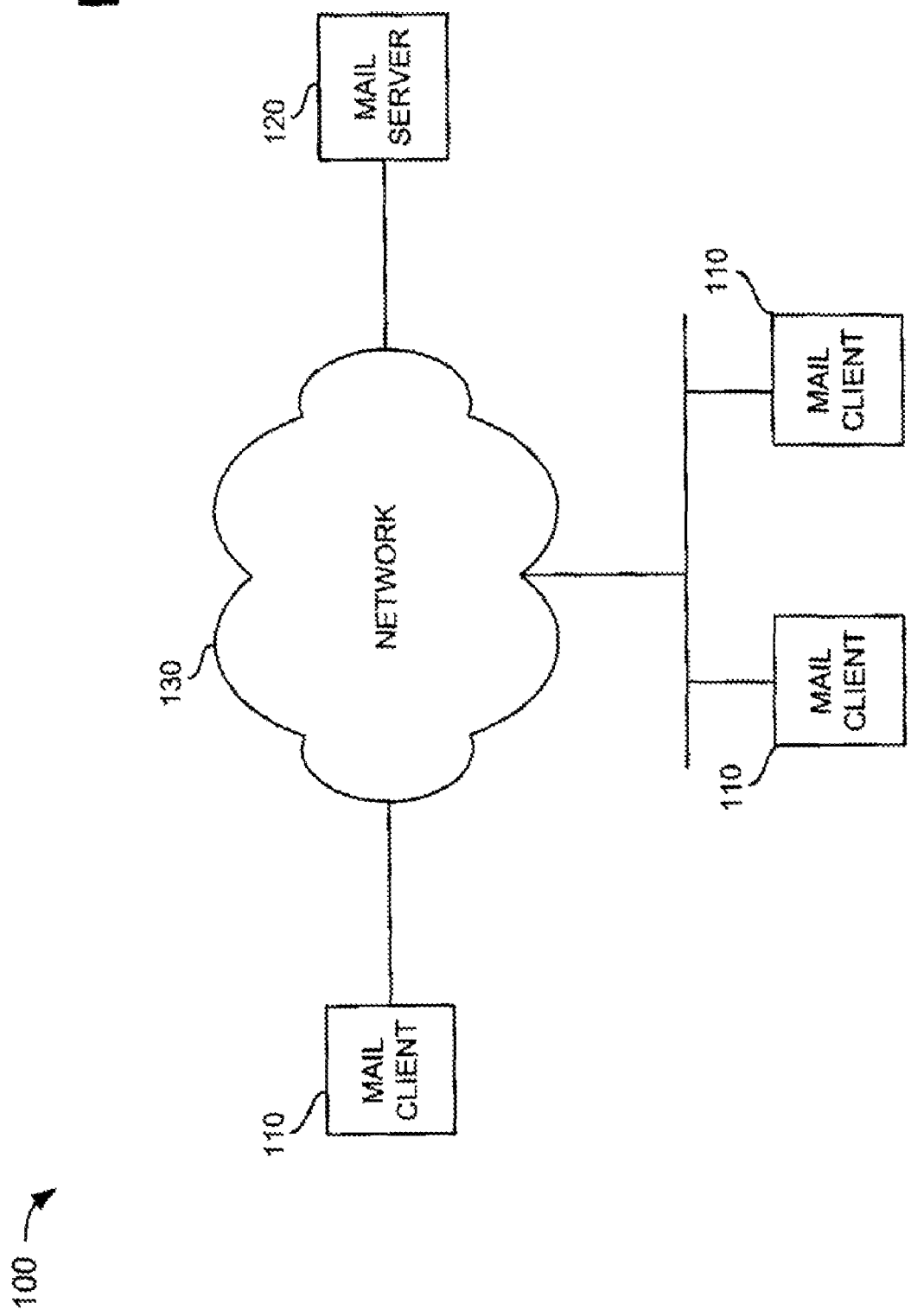
FIG. 1 is a diagram of a system in which systems and methods consistent with the present invention may be implemented.

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide virus, worm, and unsolicited e-mail detection and/or prevention in e-mail servers. Placing these features in e-mail servers provides a number of new advantages, including the ability to align hash blocks to crucial boundaries found in e-mail messages and eliminate certain counter-measures by the attacker, such as using small Internet Protocol (IP) fragments to limit the detectable content in each packet. It also allows these features to relate e-mail header fields with the potentially-harmful segment of the message (usually an "attachment"), and decode common file-packing and encoding formats that might otherwise make a virus or worm undetectable by the packet-based technique (e.g., ".zip files").

By placing these features within an e-mail server, the ability to detect replicated content in the network at points where large quantities of traffic are present is obtained. By relating many otherwise-independent messages and finding common factors, the e-mail server may detect unknown, as well as known, viruses and worms. These features may also be applied to detect potential unsolicited commercial e-mail ("spam").

E-mail servers for major Internet Service Providers (ISPs) may process a million e-mail messages a day, or more, in a single server. When viruses and worms are active in the network, a substantial fraction of this e-mail may actually be traffic generated by the virus or worm. Thus, an e-mail server may have dozens to thousands of examples of a single e-mail-borne virus pass through it in a day, offering an excellent opportunity to determine the relationships between e-mail messages and detect replicated content (a feature that is indicative of virus/worm propagation) and spam, among other, more legitimate traffic (such as traffic from legitimate mailing lists).

Systems and methods consistent with the principles of the invention provide mechanisms to detect and stop e-mail-borne viruses and worms before the addressed user receives them, in an environment where the virus is still inert. Current e-mail servers do not normally execute any code in the e-mail being transported, so they are not usually subject to virus/worm infections from the content of the e-mails they process—though, they may be subject to infection via other forms of attack.

Besides e-mail-borne viruses and worms, another common problem found in e-mail is mass-e-mailing of unsolicited commercial e-mail, colloquially referred to as "spam." It is estimated that perhaps 25%-50% of all e-mail messages now received for delivery by major ISP e-mail servers is spam.

Users of network e-mail services are desirous of mechanisms to block e-mail containing viruses or worms from reaching their machines (where the virus or worm may easily do harm before the user realizes its presence). Users are also desirous of mechanisms to block unsolicited commercial e-mail that consumes their time and resources.

Many commercial e-mail services put a limit on each user's e-mail accumulating at the server, and not yet downloaded to the customer's machine. If too much e-mail arrives between times when the user reads his e-mail, additional e-mail is either "bounced" (i.e., returned to the sender's e-mail server) or even simply discarded, both of which events can seriously inconvenience the user. Because the user has no control over arriving e-mail due to e-mail-borne viruses/worms, or spam, it is a relatively common occurrence that the user's e-mail quota overflows due to unwanted and potentially harmful messages. Similarly, the authors of e-mail-borne viruses, as well as senders of spam, have no reason to limit the size of their messages. As a result, these messages are often much larger than legitimate e-mail messages, thereby increasing the risks of such denial of service to the user by overflowing the per-user e-mail quota.

Users are not the only group inconvenienced by spam and e-mail-borne viruses and worms. Because these types of unwanted e-mail can form a substantial fraction, even a majority, of e-mail traffic in the Internet, for extended periods of time, ISPs typically must add extra resources to handle a peak e-mail load that would otherwise be about half as large. This ratio of unwanted-to-legitimate e-mail traffic appears to be growing daily. Systems and methods consistent with the principles of the invention provide mechanisms to detect and discard unwanted e-mail in network e-mail servers.

Exemplary System Configuration

FIG. 1 is a diagram of an exemplary system 100 in which systems and methods consistent with the present invention may be implemented. System 100 includes mail clients 110 connected to a mail server 120 via a network 130. Connections made in system 100 may be via wired, wireless, and/or optical communication paths. While FIG. 1 shows three mail clients 110 and a single mail server 120, there can be more or fewer clients and servers in other implementations consistent with the principles of the invention.

Network 130 may facilitate communication between mail clients 110 and mail server 120. Typically, network 130 may include a collection of network devices, such as routers or switches, that transfer data between mail clients 110 and mail server 120. In an implementation consistent with the present invention, network 130 may take the form of a wide area network, a local area network, an intranet, the Internet, a public telephone network, a different type of network, or a combination of networks.

Mail clients 110 may include personal computers, laptops, personal digital assistants, or other types of wired or wireless devices that are capable of interacting with mail server 120 to receive e-mails. In another implementation, clients 110 may include software operating upon one of these devices. Client 110 may present e-mails to a user via a graphical user interface.

Mail server 120 may include a computer or another device that is capable of providing e-mail services for mail clients 110. In another implementation, server 120 may include software operating upon one of these devices.

Figure 2:
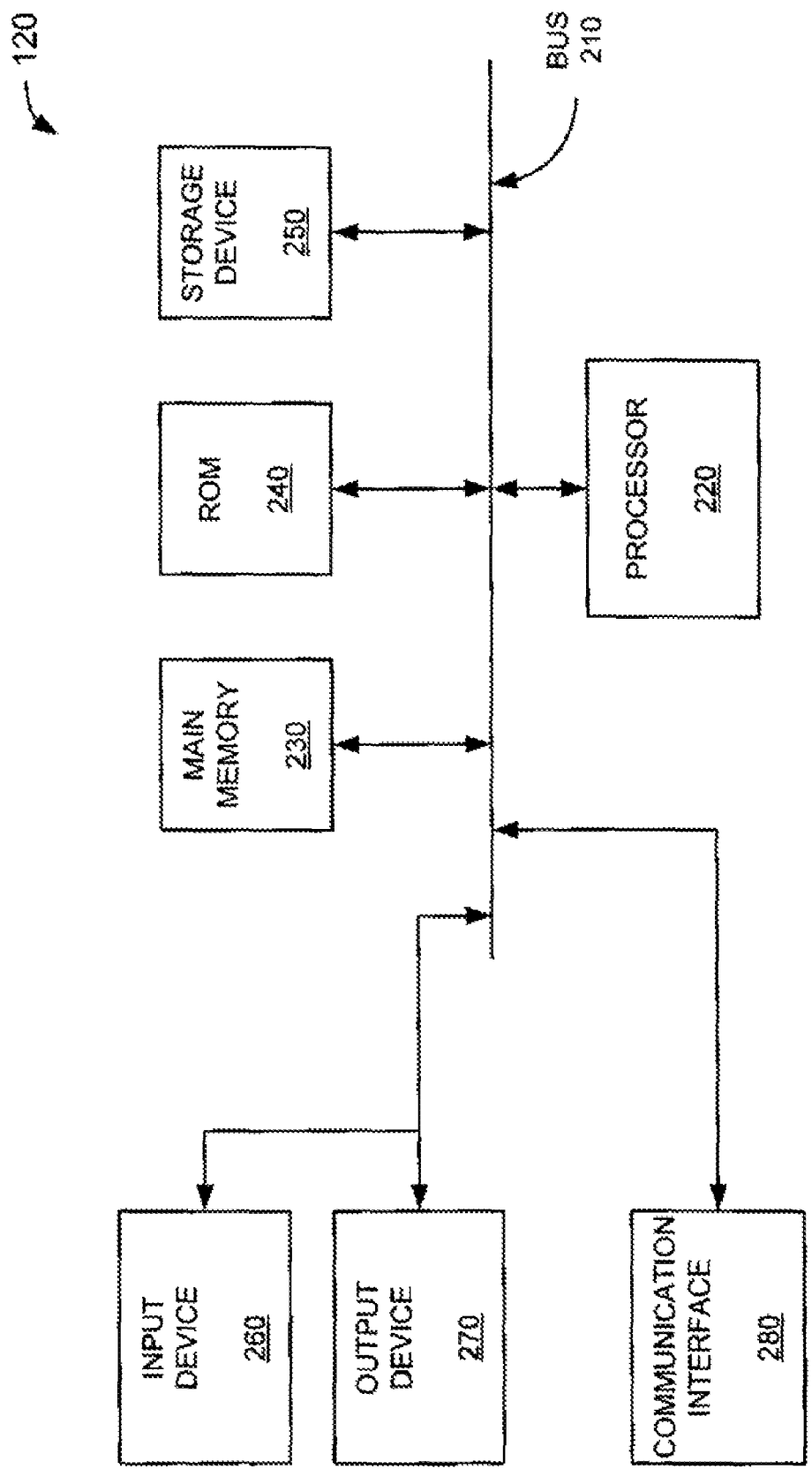
FIG. 2 is an exemplary diagram of the e-mail server of FIG. 1 according to an implementation consistent with the principles of the invention.

FIG. 2 is an exemplary diagram of mail server 120 according to an implementation consistent with the principles of the invention. Server 120 may include bus 210, processor 220, main memory 230, read only memory (ROM) 240, storage device 250, input device 260, output device 270, and communication interface 280. Bus 210 permits communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to server 120, such as a keyboard, a mouse, a pen, voice recognition and/or biometric mechanisms, etc. Output device 270 may include one or more conventional mechanisms that output information to the operator, such as a display, a printer, a pair of speakers, etc. Communication interface 280 may include any transceiver-like mechanism that enables server 120 to communicate with other devices and/or systems. For example, communication interface 280 may include mechanisms for communicating with another device or system via a network, such as network 130.

As will be described in detail below, server 120, consistent with the present invention, provides e-mail services to clients 110, while detecting unwanted e-mails and/or preventing unwanted e-mails from reaching clients 110. Server 120 may perform these tasks in response to processor 220 executing sequences of instructions contained in, for example, memory 230. These instructions may be read into memory 230 from another computer-readable medium, such as storage device 250 or a carrier wave, or from another device via communication interface 280.

Execution of the sequences of instructions contained in memory 230 may cause processor 220 to perform processes that will be described later. Alternatively, hardwired circuitry may be used in place of or in combination with software instructions to implement processes consistent with the present invention. Thus, processes performed by server 120 are not limited to any specific combination of hardware circuitry and software.

Figure 3:
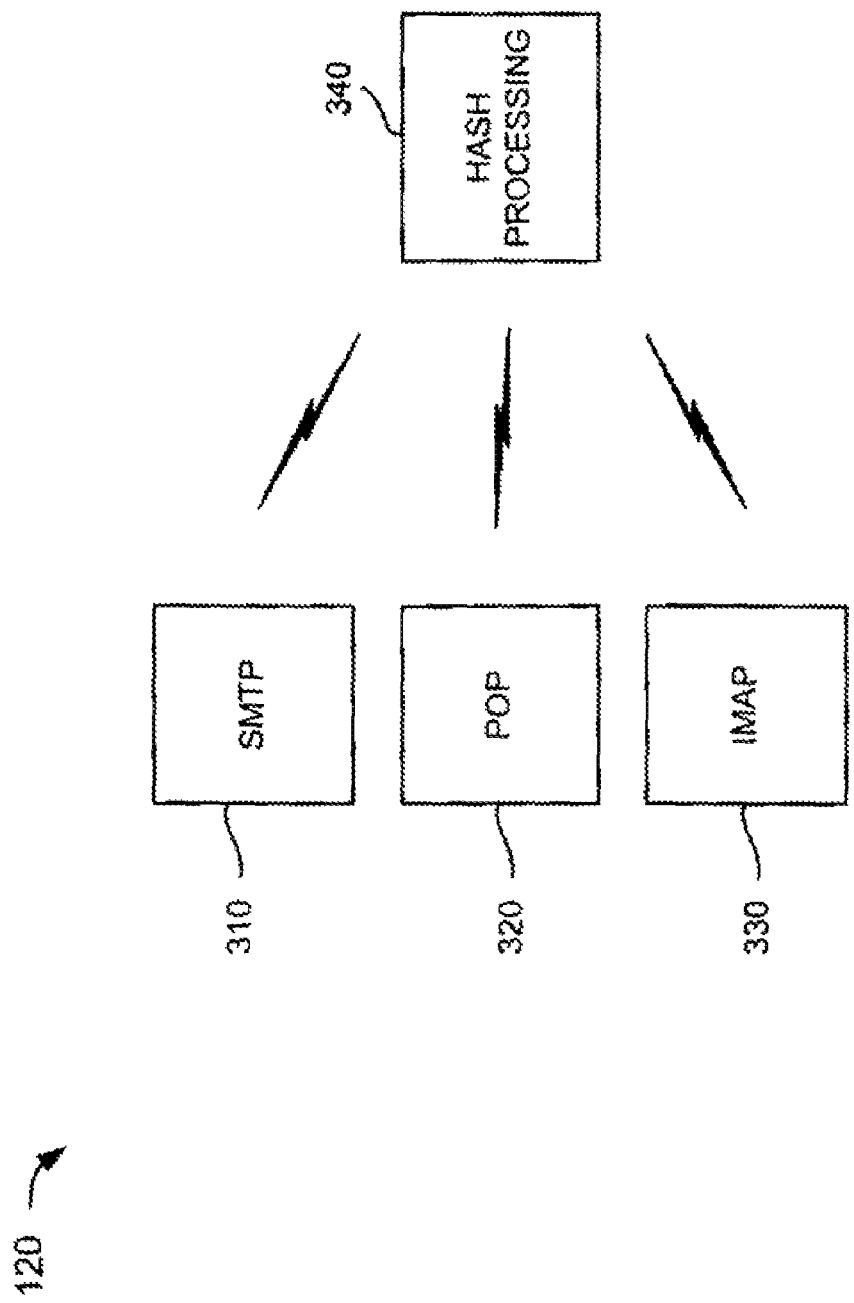
FIG. 3 is an exemplary functional block diagram of the e-mail server of FIG. 2 according to an implementation consistent with the principles of the invention.

FIG. 3 is an exemplary functional block diagram of mail server 120 according to an implementation consistent with the principles of the invention. Server 120 may include a Simple Mail Transfer Protocol (SMTP) block 310, a Post Office Protocol (POP) block 320, an Internet Message Access Protocol (IMAP) block 330, and a hash processing block 340.

SMTP block 310 may permit mail server 120 to communicate with other mail servers connected to network 130 or another network. SMTP is designed to efficiently and reliably transfer e-mail across networks. SMTP defines the interaction between mail servers to facilitate the transfer of e-mail even when the mail servers are implemented on different types of computers or running different operating systems.

POP block 320 may permit mail clients 110 to retrieve e-mail from mail server 120. POP block 320 may be designed to always receive incoming e-mail. POP block 320 may then hold e-mail for mail clients 110 until mail clients 110 connect to download them.

IMAP block 330 may provide another mechanism by which mail clients 110 can retrieve e-mail from mail server 120. IMAP block 330 may permit mail clients 110 to access remote e-mail as if the e-mail was local to mail clients 110.

Hash processing block 340 may interact with SMTP block 310, POP block 320, and/or IMAP block 330 to detect and prevent transmission of unwanted e-mail, such as e-mails containing viruses or worms and unsolicited commercial e-mail (spam).

Figure 4:
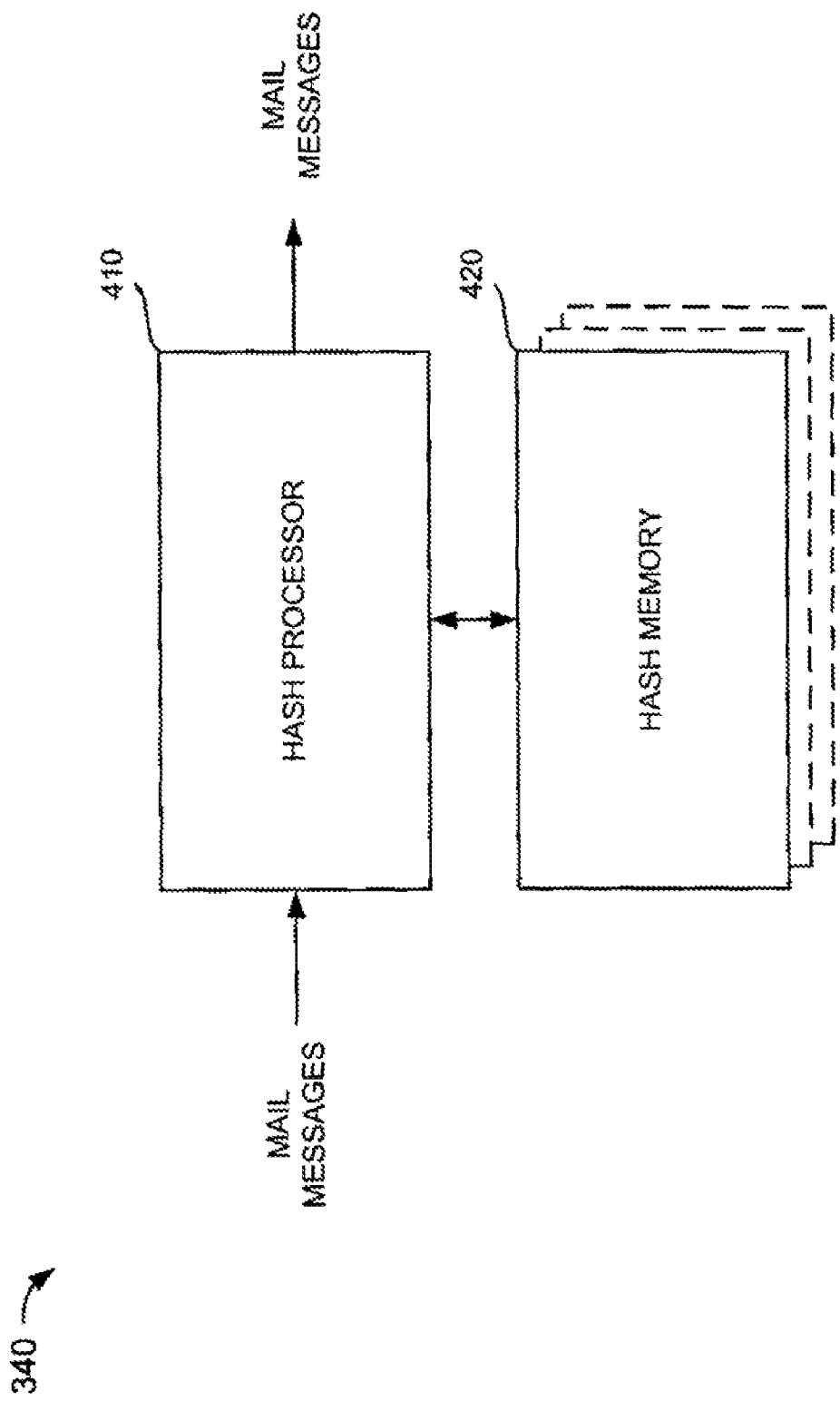
FIG. 4 is an exemplary diagram of the hash processing block of FIG. 3 according to an implementation consistent with the principles of the invention.

FIG. 4 is an exemplary diagram of hash processing block 340 according to an implementation consistent with the principles of the invention. Hash processing block 340 may include hash processor 410 and one or more hash memories 420. Hash processor 410 may include a conventional processor, an application specific integrated circuit (ASIC), a field-programmable gate array (FPGA), or some other type of device that generates one or more representations for each received e-mail and records the e-mail representations in hash memory 420.

An e-mail representation will likely not be a copy of the entire e-mail, but rather it may include a portion of the e-mail or some unique value representative of the e-mail. For example, a fixed width number may be computed across portions of the e-mail in a manner that allows the entire e-mail to be identified.

To further illustrate the use of representations, a 32-bit hash value, or digest, may be computed across portions of each e-mail. Then, the hash value may be stored in hash memory 420 or may be used as an index, or address, into hash memory 420. Using the hash value, or an index derived therefrom, results in efficient use of hash memory 420 while still allowing the content of each e-mail passing through mail server 120 to be identified.

Systems and methods consistent with the present invention may use any storage scheme that records information about one or more portions of each e-mail in a space-efficient fashion, that can definitively determine if a portion of an e-mail has not been observed, and that can respond positively (i.e., in a predictable way) when a portion of an e-mail has been observed. Although systems and methods consistent with the present invention can use virtually any technique for deriving representations of portions of e-mails, the remaining discussion will use hash values as exemplary representations of portions of e-mails received by mail server 120.

In implementations consistent with the principles of the invention, hash processor 410 may hash one or more portions of a received e-mail to produce a hash value used to facilitate hash-based detection. For example, hash processor 410 may hash one or more of the main text within the message body, any attachments, and one or more header fields, such as sender-related fields (e.g., "From:," "Sender:," "Reply-To:," "Return-Path:," and "Error-To:"). Hash processor 410 may perform one or more hashes on each of the e-mail portions using the same or different hash functions.

As described in more detail below, hash processor 410 may use the hash results of the hash operation to recognize duplicate occurrences of e-mails and raise a warning if the duplicate e-mail occurrences arrive within a short period of time and raise their level of suspicion above some threshold. It may also be possible to use the hash results for tracing the path of an unwanted e-mail through the network.

Each hash value may be determined by taking an input block of data and processing it to obtain a numerical value that represents the given input data. Suitable hash functions are readily known in the art and will not be discussed in detail herein. Examples of hash functions include the Cyclic Redundancy Check (CRC) and Message Digest 5 (MD5). The resulting hash value, also referred to as a message digest or hash digest, may include a fixed length value. The hash value may serve as a signature for the data over which it was computed.

The hash value essentially acts as a fingerprint identifying the input block of data over which it was computed. Unlike fingerprints, however, there is a chance that two very different pieces of data will hash to the same value, resulting in a hash collision. An acceptable hash function should provide a good distribution of values over a variety of data inputs in order to prevent these collisions. Because collisions occur when different input blocks result in the same hash value, an ambiguity may arise when attempting to associate a result with a particular input.

Hash processor 410 may store a representation of each e-mail it observes in hash memory 420. Hash processor 410 may store the actual hash values as the e-mail representations or it may use other techniques for minimizing storage requirements associated with retaining hash values and other information associated therewith. A technique for minimizing storage requirements may use one or more arrays or Bloom filters.

Rather than storing the actual hash value, which can typically be on the order of 32 bits or more in length, hash processor 410 may use the hash value as an index for addressing an array within hash memory 420. In other words, when hash processor 410 generates a hash value for a portion of an e-mail, the hash value serves as the address location into the array. At the address corresponding to the hash value, a count value may be incremented at the respective storage location, thus, indicating that a particular hash value, and hence a particular e-mail portion, has been seen by hash processor 410. In one implementation, the count value is associated with an 8-bit counter with a maximum value that sticks at 255. While counter arrays are described by way of example, it will be appreciated by those skilled in the relevant art, that other storage techniques may be employed without departing from the spirit of the invention.

Hash memory 420 may store a suspicion count that is used to determine the overall suspiciousness of an e-mail message. For example, the count value (described above) may be compared to a threshold, and the suspicion count for the e-mail may be incremented if the threshold is exceeded. Hence, there may be a direct relationship between the count value and the suspicion count, and it may be possible for the two values to be the same. The larger the suspicion count, the more important the hit should be considered in determining the overall suspiciousness of the packet. Alternatively, the suspicion count can be combined in a "scoring function" with values from this or other hash blocks in the same message in order to determine whether the message should be considered suspicious.

It is not enough, however, for hash memory 420 to simply identify that an e-mail contains content that has been seen recently. There are many legitimate sources (e.g., e-mail list servers) that produce multiple copies of the same message, addressed to multiple recipients. Similarly, individual users often e-mail messages to a group of people and, thus, multiple copies might be seen if several recipients happen to receive their mail from the same server. Also, people often forward copies of received messages to friends or co-workers.

In addition, virus/worm authors typically try to minimize the replicated content in each copy of the virus/worm, in order to not be detected by existing virus and worm detection technology that depends on detecting fixed sequences of bytes in a known virus or worm. These mutable viruses/worms are usually known as polymorphic, and the attacker's goal is to minimize the recognizability of the virus or worm by scrambling each copy in a different way. For the virus or worm to remain viable, however, a small part of it can be mutable in only a relatively small number of ways, because some of its code must be immediately-executable by the victim's computer, and that limits the mutation and obscurement possibilities for the critical initial code part.

In order to accomplish the proper classification of various types of legitimate and unwanted e-mail messages, multiple hash memories 420 can be employed, with separate hash memories 420 being used for specific sub-parts of a standard e-mail message. The outputs of different ones of hash memories 420 can then be combined in an overall "scoring" or classification function to determine whether the message is undesirable or legitimate, and possibly estimate the probability that it belongs to a particular class of traffic, such as a virus/worm message, spam, e-mail list message, normal user-to-user message.

For e-mail following the Internet mail standard REC 822 (and its various extensions), hashing of certain individual e-mail header fields into field-specific hash memories 420 may be useful. Among the header fields for which this may be helpful are: (1) various sender-related fields, such as "From:", "Sender:", "Reply-To:", "Return-Path:" and "Error-To:"; (2) the "To:" field (often a fixed value for a mailing list, frequently missing or idiosyncratic in spam messages); and (3) the last few "Received:" headers (i.e., the earliest ones, since they are normally added at the top of the message), excluding any obvious timestamp data. It may also be useful to hash a combination of the "From:" field and the e-mail address of the recipient (transferred as part of the SMTP mail-transfer protocol, and not necessarily found in the message itself).

Any or all of hash memories 420 may be pre-loaded with knowledge of known good or bad traffic. For example, known viruses and spam content (e.g., the infamous "Craig Shergold letter" or many pyramid swindle letters) can be pre-hashed into the relevant hash memories 420, and/or periodically refreshed in the memory as part of a periodic "cleaning" process described below. Also, known legitimate mailing lists, such as mailing lists from legitimate e-mail list servers, can be added to a "From:" hash memory 420 that passes traffic without further examination.

Over time, hash memories 420 may fill up and the possibility of overflowing an existing count value increases. The risk of overflowing a count value may be reduced if the counter arrays are periodically flushed to other storage media, such as a magnetic disk drive, optical media, solid state drive, or the like. Alternatively, the counter arrays may be slowly and incrementally erased. To facilitate this, a time-table may be established for flushing/erasing the counter arrays. If desired, the flushing/erasing cycle can be reduced by computing hash values only for a subset of the e-mails received by mail server 120. While this approach reduces the flushing/erasing cycle, it increases the possibility that a target e-mail may be missed (i.e., a hash value is not computed over a portion of it).

Non-zero storage locations within hash memories 420 may be decremented periodically rather than being erased. This may ensure that the "random noise" from normal e-mail traffic would not remain in a counter array indefinitely. Replicated traffic (e.g., e-mails containing a virus/worm that are propagating repeatedly across the network), however, would normally cause the relevant storage locations to stay substantially above the "background noise" level.

One way to decrement the count values in the counter array fairly is to keep a total count, for each hash memory 420, of every time one of the count values is incremented. After this total count reaches some threshold value (probably in the millions), for every time a count value is incremented in hash memory 420, another count value gets decremented. One way to pick the count value to decrement is to keep a counter, as a decrement pointer, that simply iterates through the storage locations sequentially. Every time a decrement operation is performed, the following may done: (a) examine the candidate count value to be decremented and if non-zero, decrement it and increment the decrement pointer to the next storage location; and (b) if the candidate count value is zero, then examine each sequentially-following storage location until a non-zero count value is found, decrement that count value, and advance the decrement pointer to the following storage location.

It may be important to avoid decrementing any counters below zero, while not biasing decrements unfairly. Because it may be assumed that the hash is random, this technique should not favor any particular storage location, since it visits each of them before starting over. This technique may be superior to a timer-based decrement because it keeps a fixed total count population across all of the storage locations, representing the most recent history of traffic, and is not subject to changes in behavior as the volume of traffic varies over time.

A variation of this technique may include randomly selecting a count value to decrement, rather than processing them cyclically. In this variation, if the chosen count value is already zero, then another one could be picked randomly, or the count values in the storage locations following the initially-chosen one could be examined in series, until a non-zero count value is found.

Exemplary Processing for Unwanted E-Mail Detection/Prevention

FIGS. 5A-5E are flowcharts of exemplary processing for detecting and/or preventing transmission of unwanted e-mail, such as an e-mail containing a virus or worm, including a polymorphic virus or worm, or an unsolicited commercial e-mail (spam), according to an implementation consistent with the principles of the invention. The processing of FIGS. 5A-5E will be described in terms of a series of acts that may be performed by mail server 120. In implementations consistent with the principles of the invention, some of the acts may be optional and/or performed in an order different than that described. In other implementations, different acts may be substituted for described acts or added to the process.

Figure 5A:
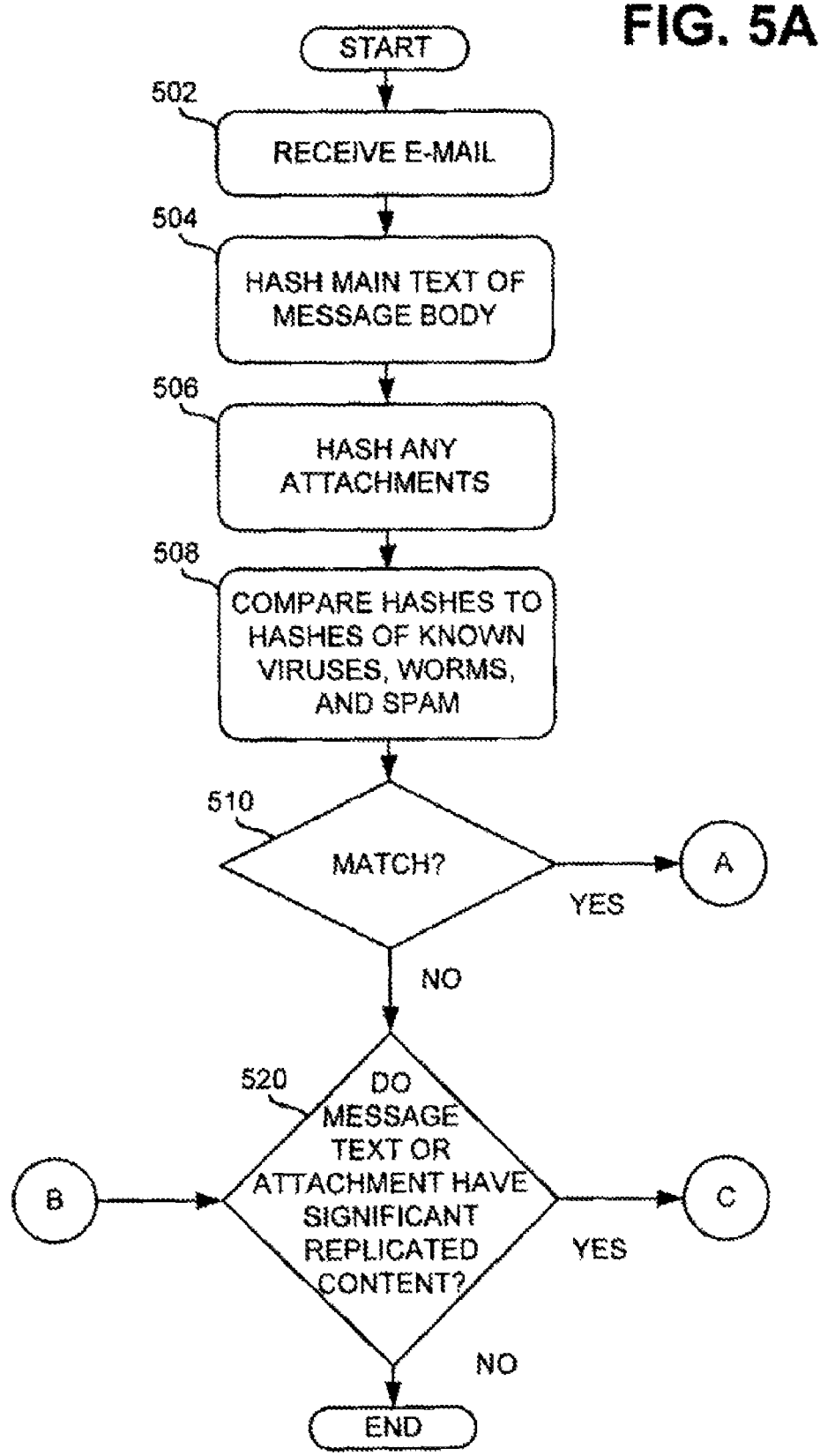
FIGS. 5A-5E are flowcharts of exemplary processing for detecting and/or preventing transmission of an unwanted e-mail message, such as an e-mail containing a virus or worm, including a polymorphic virus or worm, or an unsolicited commercial e-mail, according to an implementation consistent with the principles of the invention.

Processing may begin when hash processor 410 (FIG. 4) receives, or otherwise observes, an e-mail message (act 502) (FIG. 5A). Hash processor 410 may hash the main text of the message body, excluding any attachments (act 504). When hashing the main text, hash processor 410 may perform one or more conventional hashes covering one or more portions, or all, of the main text. For example, hash processor 410 may perform hash functions on fixed or variable sized blocks of the main text. It may be beneficial for hash processor 410 to perform multiple hashes on each of the blocks using the same or different hash functions.

It may be desirable to pre-process the main text to remove attempts to fool pattern-matching mail filters. An example of this is HyperText Markup Language (HTML) e-mail, where spammers often insert random text strings in HTML comments between or within words of the text. Such e-mail may be referred to as "polymorphic spam" because it attempts to make each message appear unique. This method for evading detection might otherwise defeat the hash detection technique, or other string-matching techniques. Thus, removing all HTML comments from the message before hashing it may be desirable. It might also be useful to delete HTML tags from the message, or apply other specialized, but simple, pre-processing techniques to remove content not actually presented to the user. In general, this may be done in parallel with the hashing of the message text, since viruses and worms may be hidden in the non-visible content of the message text.

Hash processor 410 may also hash any attachments, after first attempting to expand them if they appear to be known types of compressed files (e.g., "zip" files) (act 506). When hashing an attachment, hash processor 410 may perform one or more conventional hashes covering one or more portions, or all, of the attachment. For example, hash processor 410 may perform hash functions on fixed or variable sized blocks of the attachment. It may be beneficial for hash processor 410 to perform multiple hashes on each of the blocks using the same or different hash functions.

Hash processor 410 may compare the main text and attachment hashes with known viruses, worms, or spam content in a hash memory 420 that is pre-loaded with information from known viruses, worms, and spam content (acts 508 and 510).

If there are any hits in this hash memory 420, there is a probability that the e-mail message contains a virus or worm or is spam. A known polymorphic virus may have only a small number of hashes that match in this hash memory 420, out of the total number of hash blocks in the message. A non-polymorphic virus may have a very high fraction of the hash blocks hit in hash memory 420. For this reason, storage locations within hash memory 420 that contain entries from polymorphic viruses or worms may be given more weight during the pre-loading process, such as by giving them a high initial suspicion count value.

A high fraction of hits in this hash memory 420 may cause the message to be marked as a probable known virus/worm or spam. In this case, the e-mail message can be sidetracked for remedial action, as described below.

A message with a significant "score" from polymorphic virus/worm hash value hits may or may not be a virus/worm instance, and may be sidetracked for further investigation, or marked as suspicious before forwarding to the recipient. An additional check may also be made to determine the level of suspicion.

Figure 5B:
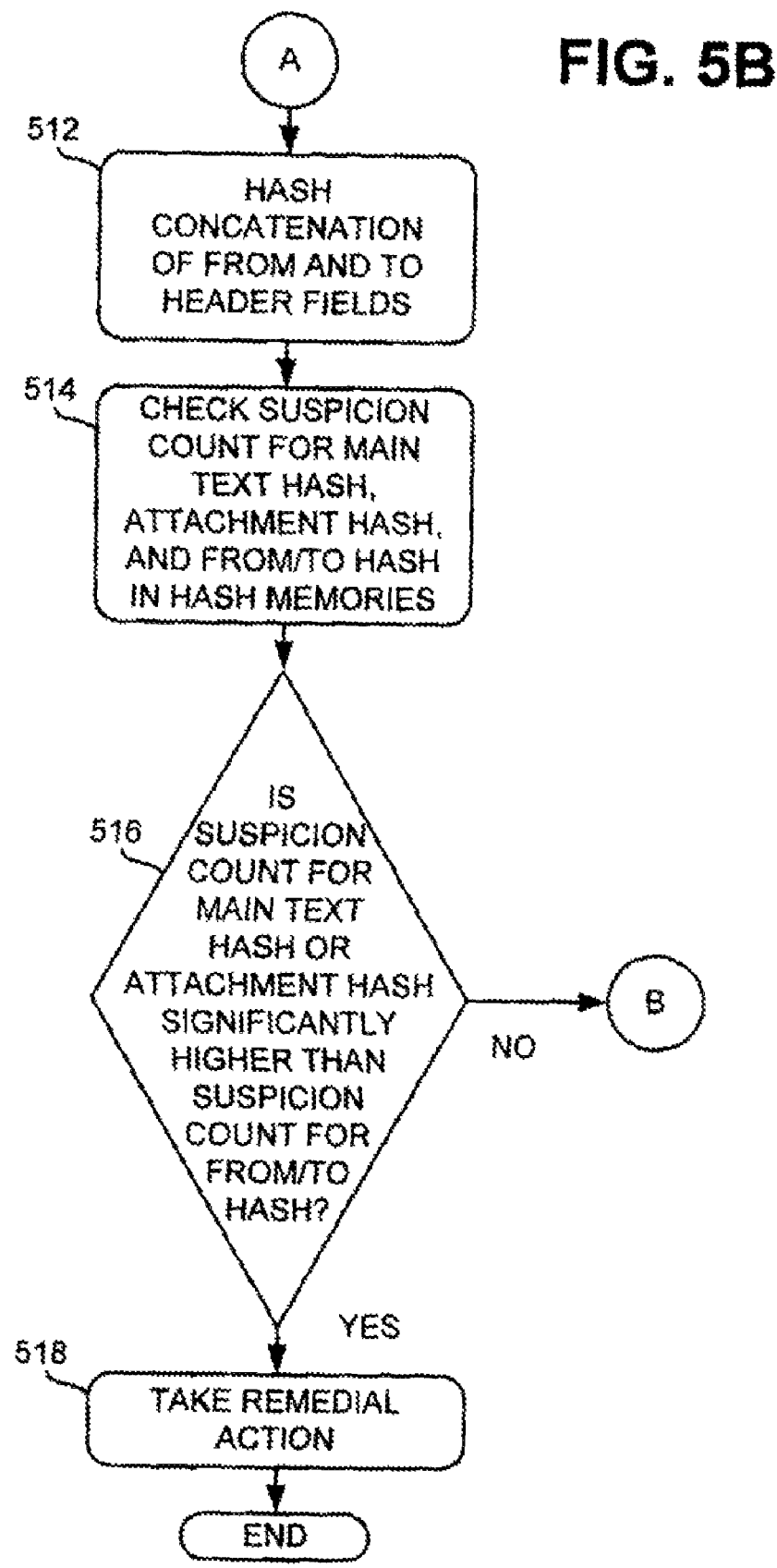

For example, hash processor 410 may hash a concatenation of the From and To header fields of the e-mail message (act 512) (FIG. 5B). Hash processor 410 may then check the suspicion counts in hash memories 420 for the hashes of the main text, any attachments, and the concatenated From/To (act 514). Hash processor 410 may determine whether the main text or attachment suspicion count is significantly higher than the From/To suspicion count (act 516). If so, then the content is appearing much more frequently outside the messages between this set of users (which might otherwise be due to an e-mail exchange with repeated message quotations) and, thus, is much more suspicious.

When this occurs, hash processor 410 may take remedial action (act 518). The remedial action taken might take different forms, which may be programmable or determined by an operator of mail server 120. For example, hash processor 410 may discard the e-mail. This is not recommended for anything but virtually-certain virus/worm/spam identification, such as a perfect match to a known virus.

As an alternate technique, hash processor 410 may mark the e-mail with a warning in the message body, in an additional header, or other user-visible annotation, and allow the user to deal with it when it is downloaded. For data that appears to be from an unknown mailing list, a variant of this option is to request the user to send back a reply message to the server, classifying the suspect message as either spam or a mailing list. In the latter case, the mailing list source address can be added to the "known legitimate mailing lists" hash memory 420.

As another technique, hash processor 410 may subject the e-mail to more sophisticated (and possibly more resource-consuming) detection algorithms to make a more certain determination. This is recommended for potential unknown viruses/worms or possible detection of a polymorphic virus/worm.

As yet another technique, hash processor 410 may hold the e-mail message in a special area and create a special e-mail message to notify the user of the held message (probably including From and Subject fields). Hash processor 410 may also give instructions on how to retrieve the message.

As a further technique, hash processor 410 may mark the e-mail message with its suspicion score result, but leave it queued for the user's retrieval. If the user's quota would overflow when a new message arrives, the score of the incoming message and the highest score of the queued messages are compared. If the highest queued message has a score above a settable threshold, and the new message's score is lower than the threshold, the queued message with the highest score may be deleted from the queue to make room for the new message. Otherwise, if the new message has a score above the threshold, it may be discarded or "bounced" (e.g., the sending e-mail server is told to hold the message and retry it later). Alternatively, if it is desired to never bounce incoming messages, mail server 120 may accept the incoming message into the user's queue and repeatedly delete messages with the highest suspicion score from the queue until the total is below the user's quota again.

As another technique, hash processor 410 may apply hash-based functions as the e-mail message starts arriving from the sending server and determine the message's suspicion score incrementally as the message is read in. If the message has a high-enough suspicion score (above a threshold) during the early part of the message, mail server 120 may reject the message, optionally with either a "retry later" or a "permanent refusal" result to the sending server (which one is used may be determined by settable thresholds applied to the total suspicion score, and possibly other factors, such as server load). This results in the unwanted e-mail using up less network bandwidth and receiving server resources, and penalizes servers sending unwanted mail, relative to those that do not.

If the suspicion count for the main text or any attachment is not significantly higher than the From/To suspicion count (act 516), hash processor 410 may determine whether the main text or any attachment has significant replicated content (non-zero or high suspicion count values for many hash blocks in the text/attachment content in all storage locations of hash memories 420) (act 520) (FIG. 5A). If not, the message is probably a normal user-to-user e-mail. These types of messages may be "passed" without further examination. When appropriate, hash processor 410 may also record the generated hash values by incrementing the suspicion count value in the corresponding storage locations in hash memory 420.

Figure 5C:
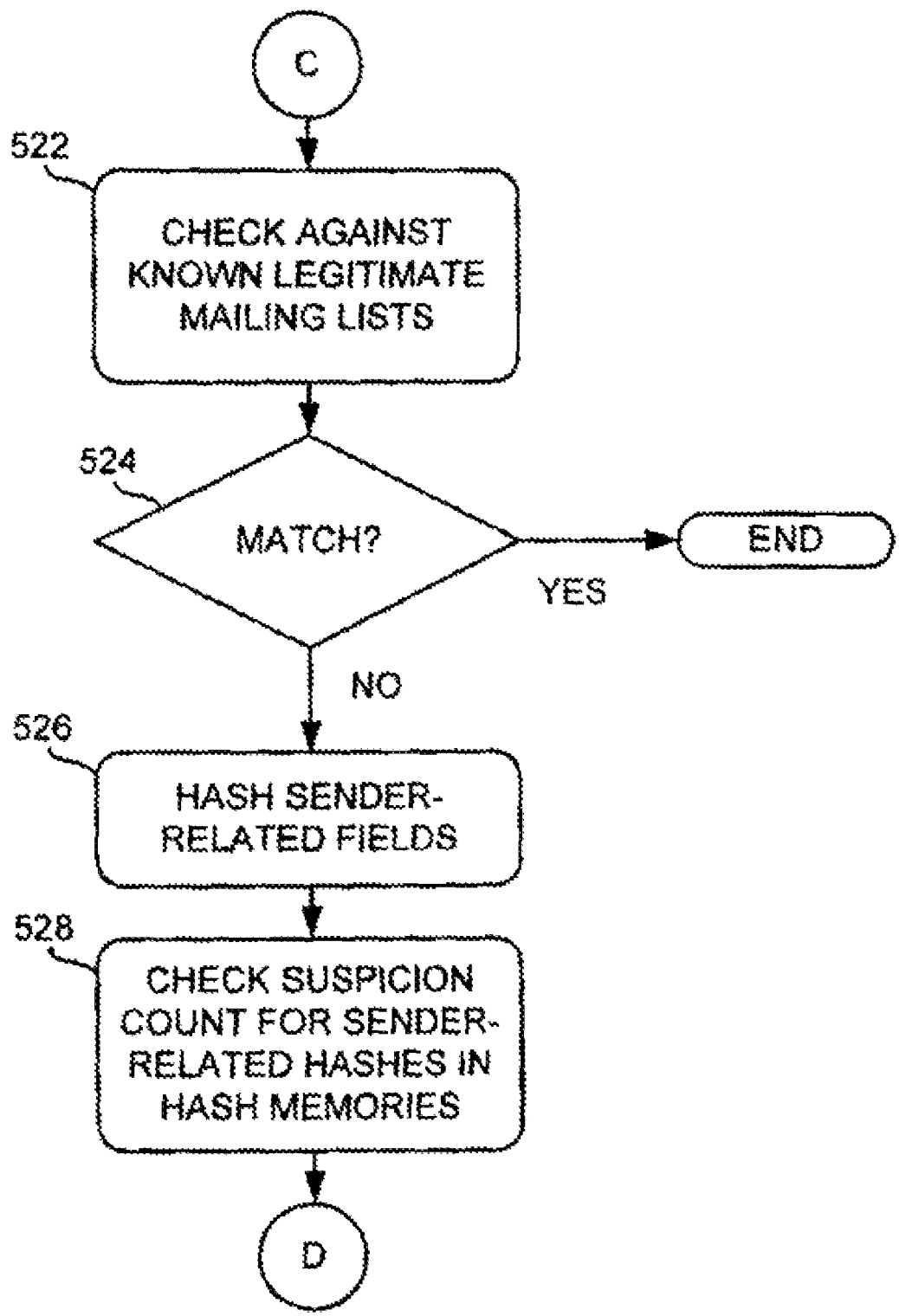

If the message text is substantially replicated (e.g., greater than 90%), hash processor 410 may check one or more portions of the e-mail message against known legitimate mailing lists within hash memory 420 (act 522) (FIG. 5C). For example, hash processor 410 may hash the From or Sender fields of the e-mail message and compare it/them to known legitimate mailing lists within hash memory 420. Hash processor 410 may also determine whether the e-mail actually appears to originate from the correct source for the mailing list by examining, for example, the sequence of Received headers. Hash processor 410 may further examine a combination of the From or Sender fields and the recipient address to determine if the recipient has previously received e-mail from the sender. This is typical for mailing lists, but atypical of unwanted e-mail, which will normally not have access to the actual list of recipients for the mailing list. Failure of this examination may simply pass the message on, but mark it as "suspicious," since the recipient may simply be a new subscriber to the mailing list, or the mailings may be infrequent enough to not persist in the hash counters between mailings.

If there is a match with a legitimate mailing list (act 524), then the message is probably a legitimate mailing list duplicate and may be passed with no further examination. This assumes that the mailing list server employs some kind of filtering to exclude unwanted e-mail (e.g., refusing to forward e-mail that does not originate with a known list recipient or refusing e-mail with attachments).

If there is no match with any legitimate mailing lists within hash memory 420, hash processor 410 may hash the sender-related fields (e.g., From, Sender, Reply-To) (act 526). Hash processor 410 may then determine the suspicion count for the sender-related hashes in hash memories 420 (act 528).

Figure 5D:
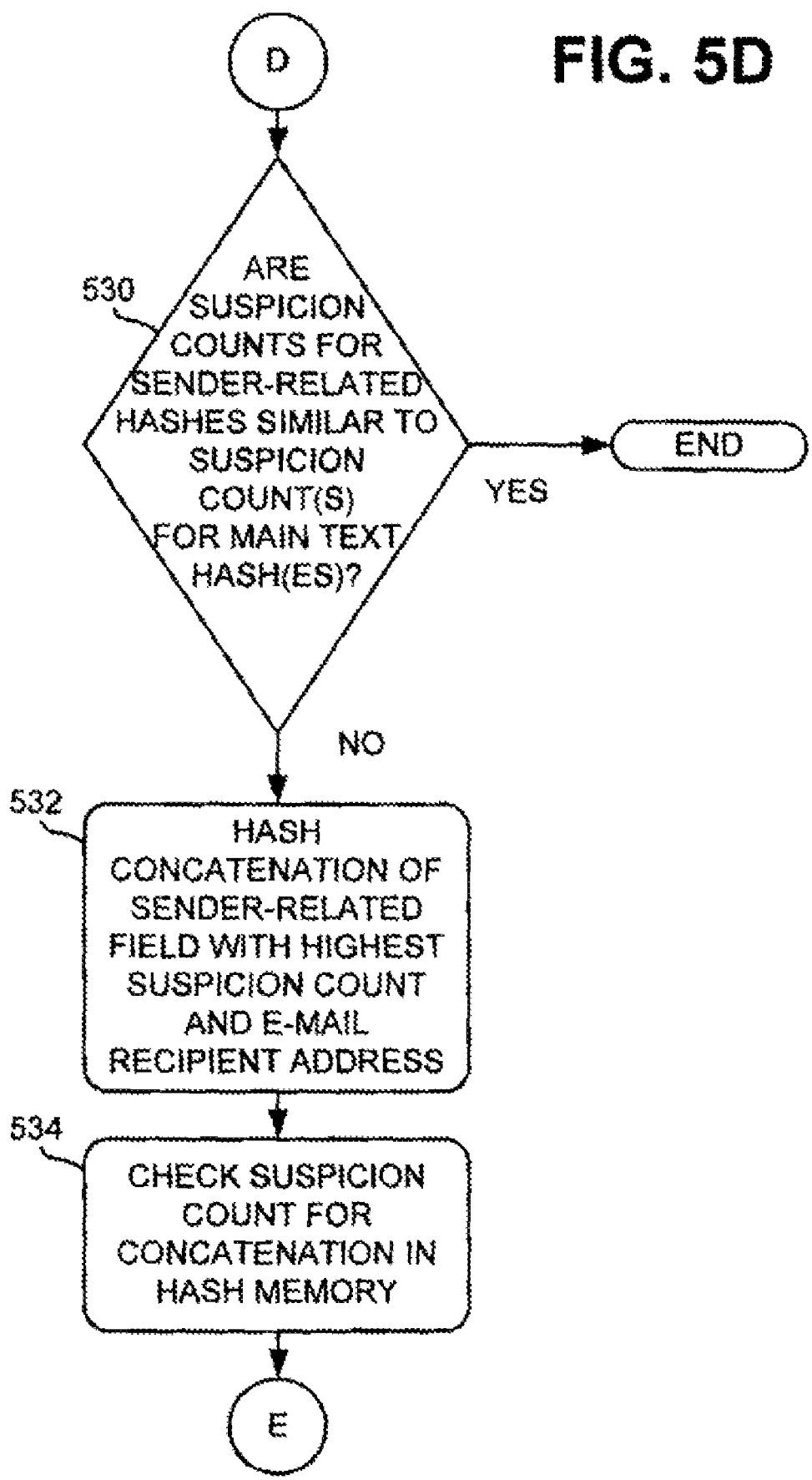
Figure 5E:
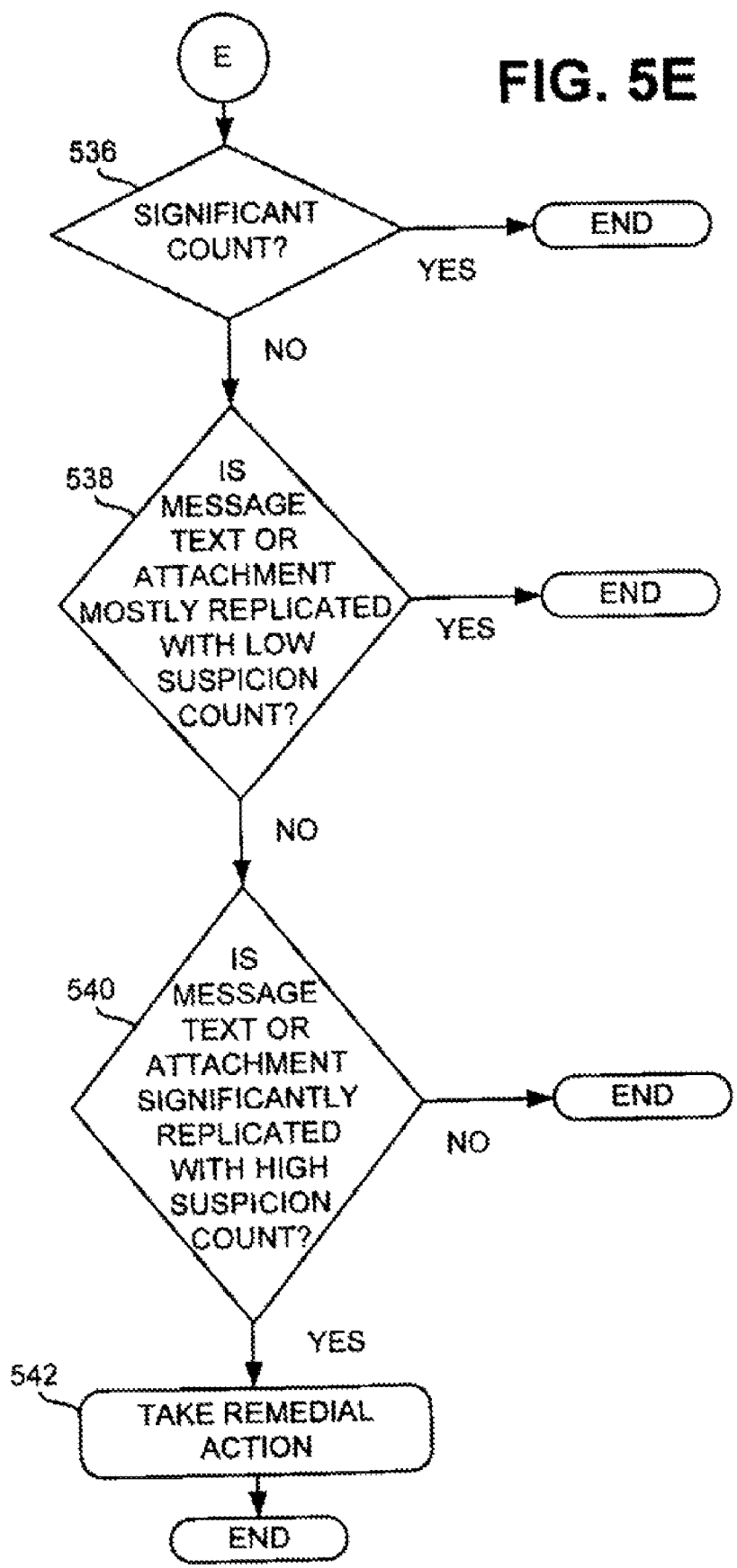

Hash processor 410 may determine whether the suspicion counts for the sender-related hashes are similar to the suspicion count(s) for the main text hash(es) (act 530) (FIG. 5D). If both From and Sender fields are present, then the Sender field should match with roughly the same suspicion count value as the message body hash. The From field may or may not match. For a legitimate mailing list, it may be a legitimate mailing list that is not in the known legitimate mailing lists hash memory 420 (or in the case where there is no known legitimate mailing lists hash memory 420). If only the From field is present, it should match about as well as the message text for a mailing list. If none of the sender-related fields match as well as the message text, the e-mail message may be considered moderately suspicious (probably spam, with a variable and fictitious From address or the like).

As an additional check, hash processor 410 may hash the concatenation of the sender-related field with the highest suspicion count value and the e-mail recipient's address (act 532). Hash processor 410 may then check the suspicion count for the concatenation in a hash memory 420 used just for this check (act 534). If it matches with a significant suspicion count value (act 536) (FIG. 5E), then the recipient has recently received multiple messages from this source, which makes it probable that it is a mailing list. The e-mail message may then be passed without further examination.

If the message text or attachments are mostly replicated (e.g., greater than 90% of the hash blocks), but with mostly low suspicion count values in hash memory 420 (act 538), then the message is probably a case of a small-scale replication of a single message to multiple recipients. In this case, the e-mail message may then be passed without further examination.

If the message text or attachments contain some significant degree of content replication (say, greater than 50% of the hash blocks) and at least some of the hash values have high suspicion count values in hash memory 420 (act 540), then the message is fairly likely to be a virus/worm or spam. A virus or worm should be considered more likely if the high-count matches are in an attachment. If the highly-replicated content is in the message text, then the message is more likely to be spam, though it is possible that e-mail text employing a scripting language (e.g., Java script) might also contain a virus.

If the replication is in the message text, and the suspicion count is substantially higher for the message text than for the From field, the message is likely to be spam (because spammers generally vary the From field to evade simpler spam filters). A similar check can be made for the concatenation of the From and To header fields, except that in this case, it is most suspicious if the From/To hash misses (finds a zero suspicion count), indicating that the sender does not ordinarily send e-mail to that recipient, making it unlikely to be a mailing list, and very likely to be a spammer (because they normally employ random or fictitious From addresses).

In the above cases, hash processor 410 may take remedial action (act 542). The particular type of action taken by hash processor 410 may vary as described above.

CONCLUSION

Systems and methods consistent with the present invention provide mechanisms within an e-mail server to detect and/or prevent transmission of unwanted e-mail, such as e-mail containing viruses or worms, including polymorphic viruses and worms, and unsolicited commercial e-mail (spam).

Implementation of a hash-based detection mechanism in an e-mail server at the e-mail message level provides advantages over a packet-based implementation in a router or other network node device. For example, the entire e-mail message has been re-assembled, both at the packet level (i.e., IP fragment re-assembly) and at the application level (multiple packets into a complete e-mail message). Also, the hashing algorithm can be applied more intelligently to specific parts of the e-mail message (e.g., header fields, message body, and attachments). Attachments that have been compressed for transport (e.g., ".zip" files) can be expanded for inspection. Without doing this, a polymorphic virus could easily hide inside such files with no repeatable hash signature visible at the packet transport level.

With the entire message available for a single pass of the hashing process, packet boundaries and packet fragmentation do not split sequences of bytes that might otherwise provide useful hash signatures. A clever attacker might otherwise obscure a virus/worm attack by causing the IP packets carrying the malicious code to be fragmented into pieces smaller than that for which the hashing process is effective, or by forcing packet breaks in the middle of otherwise-visible fixed sequences of code in the virus/worm. Also, the entire message is likely to be longer than a single packet, thereby reducing the probability of false alarms (possibly due to insufficient hash-block sample size and too few hash blocks per packet) and increasing the probability of correct identification of a virus/worm (more hash blocks will match per message than per packet, since packets will be only parts of the entire message).

Also, fewer hash-block alignment issues arise when the hash blocks can be intelligently aligned with fields of the e-mail message, such as the start of the message body, or the start of an attachment block. This results in faster detection of duplicate contents than if the blocks are randomly aligned (as is the case when the method is applied to individual packets).

E-mail-borne malicious code, such as viruses and worms, also usually includes a text message designed to cause the user to read the message and/or perform some other action that will activate the malicious code. It is harder for such text to be polymorphic, because automatic scrambling of the user-visible text will either render it suspicious-looking, or will be very limited in variability. This fact, combined with the ability to start a hash block at the start of the message text by parsing the e-mail header, reduces the variability in hash signatures of the message, making it easier to detect with fewer examples seen.

Further, the ability to extract and hash specific headers from an e-mail message separately may be used to help classify the type of replicated content the message body carries. Because many legitimate cases of message replication exist (e.g., topical mailing lists, such as Yahoo Groups), intelligent parsing and hashing of the message headers is very useful to reduce the false alarm rate, and to increase the accuracy of detection of real viruses, worms, and spam.

This detection technique, compared to others which might extract and save fixed strings to be searched for in other pieces of e-mail, includes hash-based filters that are one-way functions (i.e., it is possible, given a piece of text, to determine if it has been seen before in another message). Given the state data contained in the filter, however, it is virtually impossible to reconstruct a prior message, or any piece of a prior message, that has been passed through the filter previously. Thus, this technique can maintain the privacy of e-mail, without retaining any information that can be attributed to a specific sender or receiver.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, systems and methods have been described with regard to a mail server. In other implementations, the systems and methods described herein may be used within other devices, such as a mail client. In such a case, the mail client may periodically obtain suspicion count values for its hash memory from one or more network devices, such as a mail server.

It may be possible for multiple mail servers to work together to detect and prevent unwanted e-mails. For example, high-scoring entries from the hash memory of one mail server might be distributed to other mail servers, as long as the same hash functions are used by the same cooperating servers. This may accelerate the detection process, especially for mail servers that experience relatively low volumes of traffic.

Further, certain portions of the invention have been described as "blocks" that perform one or more functions. These blocks may include hardware, such as an ASIC or a FPGA, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for detecting potentially unwanted e-mail messages, comprising:
   receiving a plurality of e-mail messages;
   processing the plurality of e-mail messages by removing HTML comments and HTML tags from the plurality of e-mail messages;
   generating one or more hash values based on one or more portions of the plurality of e-mail messages such that each of the plurality of e-mail messages has one or more corresponding generated hash values;
   counting the one or more of the generated hash values associated with at least one of the plurality of e-mail messages that match one or more hash values associated with at least one prior e-mail message;
   determining that the at least one of the plurality of e-mail messages is a potentially unwanted e-mail message based on the counting of the one or more of the generated hash values associated with the at least one of the plurality of e-mail messages that match the one or more of the hash values associated with the at least one prior e-mail message;
   generating at least one suspicion score for the at least one of the plurality of e-mail messages based on the counting of the one or more of the generated hash values associated with the at least one of the plurality of e-mail messages that match the one or more hash values associated with the at least one prior e-mail message; and
   taking remedial action on the at least one of the plurality of e-mail messages that is determined to be the potentially unwanted e-mail message, based on the at least one suspicion score, the taking remedial action including deleting a newly received e-mail message.

2. The method of claim 1, wherein the generating the one or more hash values includes:
   performing a plurality of hashes on a plurality of variable-sized blocks of a main text of the plurality of e-mail messages.

3. The method of claim 1, wherein the generating the one or more hash values includes:
   performing a plurality of hashes on a plurality of fixed-sized blocks of a main text of the plurality of e-mail messages.

4. The method of claim 1, wherein the generating the one or more hash values includes:
   performing a plurality of hashes on a main text of the plurality of e-mail messages using a plurality of different hash functions.

5. The method of claim 1, wherein the generating the one or more hash values includes:
   performing a plurality of hashes on a main text of the plurality of e-mail messages using a same hash function.

6. The method of claim 1, wherein the generating the one or more hash values includes:
   attempting to expand an attachment of the plurality of e-mail messages, and
   hashing the attachment after attempting to expand the attachment.

7. The method of claim 1, wherein the generating the one or more hash values includes:
   performing a plurality of hashes on a plurality of variable-sized blocks of an attachment of the plurality of e-mail messages.

8. The method of claim 1, wherein the generating the one or more hash values includes:
   performing a plurality of hashes on a plurality of fixed-sized blocks of an attachment of the plurality of e-mail messages.

9. The method of claim 1, wherein the generating the one or more hash values includes:
   performing a plurality of hashes on an attachment of the plurality of e-mail messages using a plurality of different hash functions.

10. The method of claim 1, wherein the generating the one or more hash values includes:
    performing a plurality of hashes on an attachment of the plurality of e-mail messages using a same hash function.

11. The method of claim 1, further comprising:
    comparing the generated one or more hash values to hash values corresponding to known unwanted e-mails.

12. The method of claim 11, wherein the known unwanted e-mails include at least one of e-mails containing a virus, e-mails containing a worm, or unsolicited commercial e-mails.

13. The method of claim 1, wherein the generating the one or more hash values includes:
    hashing at least one of a main text or an attachment to generate one or more first hash values, and
    hashing a concatenation of first and second header fields to generate a second hash value.

14. The method of claim 13, wherein the first and second header fields include a From header field and a To header field.

15. The method of claim 13, wherein the counting the one or more of the generated hash values associated with the at least one of the plurality of e-mail messages that match the one or more hash values associated with the at least one prior e-mail message includes:

determining a first suspicion count based on a number of the hash values associated with the at least one prior e-mail message that match the one or more first hash values, and determining a second suspicion count based on a number of the hash values associated with the at least one prior e-mail message that match the second hash value.

16. The method of claim 15, wherein the determining that at least one of the plurality of e-mail messages is a potentially unwanted e-mail message includes:

determining that the at least one of the plurality of e-mail messages is the potentially unwanted e-mail message when the first suspicion count is significantly higher than the second suspicion count.

17. The method of claim 1, wherein the taking remedial action further includes at least one of:

bouncing the at least one of the plurality of e-mail messages, marking the at least one of the plurality of e-mail messages with a warning, subjecting the at least one of the plurality of e-mail messages to a virus or worm detection process, or creating a notification message.

18. The method of claim 1, wherein the generating the one or more hash values and the counting the one or more of the generated hash values associated with the at least one of the plurality of e-mail messages that match the one or more hash values associated with the at least one prior e-mail message are performed incrementally as the plurality of e-mail messages are being received.

19. The method of claim 1, further comprising:

comparing the generated one or more hash values to hash values associated with one or more known legitimate mailing lists; and passing the plurality of e-mail messages without further examination when the one or more generated hash values associated with the at least one of the plurality of e-mail messages match one or more hash values associated with the one or more known legitimate mailing lists.

20. The method of claim 19, wherein the comparing the one or more generated hash values includes:

determining whether the plurality of e-mail messages originated from the one or more known legitimate mailing lists.

21. The method of claim 1, wherein the generating the one or more hash values includes:

hashing a main text to generate a first hash value, and hashing one or more sender-related header fields to generate one or more second hash values.

22. The method of claim 21, wherein the one or more sender-related header fields include at least one of a From header field, a Sender header field, or a Reply-To header field.

23. The method of claim 21, wherein the counting the one or more of the generated hash values associated with the at least one of the plurality of e-mail messages that match the one or more hash values associated with the at least one prior e-mail message includes:

determining a first suspicion count based on a number of the hash values associated with the at least one prior e-mail message that match the first hash value, and determining one or more second suspicion counts based on a number of the hash values associated with the at least one prior e-mail message that match the one or more second hash values.

24. The method of claim 23, wherein the determining that at least one of the plurality of e-mail messages is a potentially unwanted e-mail message includes:

determining that the at least one of the plurality of e-mail messages is the potentially unwanted e-mail message when the first suspicion count is higher than the one or more second suspicion counts.

25. The method of claim 1, wherein the generating the one or more hash values includes:

hashing a main text of the plurality of e-mail messages to generate at least one main text hash, and hashing at least one header field of the plurality of e-mail messages to generate at least one header hash.

26. The method of claim 25, wherein the counting the one or more of the generated hash values associated with the at least one of the plurality of e-mail messages that match the one or more hash values associated with the at least one prior e-mail message includes:

determining whether the at least one main text hash matches a substantially higher number of the hash values associated with the at least one prior e-mail message than the at least one header hash; and wherein the determining that at least one of the plurality of e-mail messages is a potentially unwanted e-mail message includes:

determining that the at least one of the plurality of e-mail messages is the potentially unwanted e-mail message when the at least one main text hash matches a substantially higher number of the hash values associated with the at least one prior e-mail message than the at least one header hash.

27. A computer program product embodied on a non-transitory computer-readable medium, comprising:

computer code for receiving a plurality of e-mail messages;

computer code for processing the plurality of e-mail messages by removing HTML comments and HTML tags from the plurality of e-mail messages;

computer code for generating one or more hash values based on one or more portions of the plurality of e-mail messages such that each of the plurality of e-mail messages has one or more corresponding generated hash values;

computer code for counting the one or more of the generated hash values associated with at least one of the plurality of e-mail messages that match one or more hash values associated with at least one prior e-mail message;

computer code for determining that the at least one of the plurality of e-mail messages is a potentially unwanted e-mail message based on the counting of the one or more of the generated hash values associated with the at least one of the plurality of e-mail messages that match the one or more of the hash values associated with the at least one prior e-mail message;

computer code for generating at least one suspicion score for the at least one of the plurality of e-mail messages based on the counting of the one or more of the generated hash values associated with the at least one of the plurality of e-mail messages that match the one or more hash values associated with the at least one prior e-mail message; and computer code for taking remedial action on the at least one of the plurality of e-mail messages that is determined to be the potentially unwanted e-mail message, based on the at least one suspicion score, the taking remedial action including deleting a newly received e-mail message.

28. The computer program product of claim 27, wherein the computer program product is operable such that the generating the one or more hash values includes:
performing a plurality of hashes on a plurality of variable-sized blocks of a main text of the plurality of e-mail messages.

29. The computer program product of claim 27, wherein the computer program product is operable such that the generating the one or more hash values includes:
performing a plurality of hashes on a plurality of fixed-sized blocks of a main text of the plurality of e-mail messages.

30. The computer program product of claim 27, wherein the computer program product is operable such that the generating the one or more hash values includes:
performing a plurality of hashes on a main text of the plurality of e-mail messages using a plurality of different hash functions.

31. The computer program product of claim 27, wherein the computer program product is operable such that the generating the one or more hash values includes:
performing a plurality of hashes on a main text of the plurality of e-mail messages using a same hash function.

32. The computer program product of claim 27, wherein the computer program product is operable such that the generating the one or more hash values includes:
attempting to expand an attachment of the plurality of e-mail messages, and
hashing the attachment after attempting to expand the attachment.

33. The computer program product of claim 27, wherein the computer program product is operable such that the generating the one or more hash values includes:
performing a plurality of hashes on a plurality of variable-sized blocks of an attachment of the plurality of e-mail messages.

34. The computer program product of claim 27, wherein the computer program product is operable such that the generating the one or more hash values includes:
performing a plurality of hashes on a plurality of fixed-sized blocks of an attachment of the plurality of e-mail messages.

35. The computer program product of claim 27, wherein the computer program product is operable such that the generating the one or more hash values includes:
performing a plurality of hashes on an attachment of the plurality of e-mail messages using a plurality of different hash functions.

36. The computer program product of claim 27, wherein the computer program product is operable such that the generating the one or more hash values includes:
performing a plurality of hashes on an attachment of the plurality of e-mail messages using a same hash function.

37. The computer program product of claim 27, further comprising:
computer code for comparing the generated hash values to hash values corresponding to known unwanted e-mails.

38. The computer program product of claim 37, wherein the known unwanted e-mails include at least one of e-mails containing a virus, e-mails containing a worm, or unsolicited commercial e-mails.

39. The computer program product of claim 27, wherein the computer program product is operable such that the generating the one or more hash values includes:
hashing at least one of a main text or an attachment to generate one or more first hash values, and
hashing a concatenation of first and second header fields to generate a second hash value.

40. The computer program product of claim 39, wherein the first and second header fields include a From header field and a To header field.

41. The computer program product of claim 39, wherein the computer program product is operable such that the counting the one or more of the generated hash values associated with the at least one of the plurality of e-mail messages that match the one or more hash values associated with the at least one prior e-mail message includes:
determining a first suspicion count based on a number of the hash values associated with the at least one prior e-mail message that match the one or more first hash values, and
determining a second suspicion count based on a number of the hash values associated with the at least one prior e-mail message that match the second hash value.

42. The computer program product of claim 41, wherein the computer program product is operable such that the determining that at least one of the plurality of e-mail messages is a potentially unwanted e-mail message includes:
determining that the at least one of the plurality of e-mail messages is the potentially unwanted e-mail message when the first suspicion count is significantly higher than the second suspicion count.

43. The computer program product of claim 27, wherein the computer program product is operable such that the taking remedial action further includes at least one of:
bouncing the at least one of the plurality of e-mail messages,
marking the at least one of the plurality of e-mail messages with a warning,
subjecting the at least one of the plurality of e-mail messages to a virus or worm detection process, or
creating a notification message.

44. The computer program product of claim 27, wherein the computer program product is operable such that the generating the one or more hash values and the counting the one or more of the generated hash values associated with the at least one of the plurality of e-mail messages that match the one or more hash values associated with the at least one prior e-mail message are performed incrementally as the plurality of e-mail messages are being received.

45. The computer program product of claim 27, further comprising:
computer code for comparing the generated one or more hash values to has values associated with one or more known legitimate mailing lists; and
computer code for passing the plurality of e-mail messages without further examination when the one or more generated hash values associated with the at least one of the plurality of e-mail messages match one or more hash values associated with the one or more known legitimate mailing lists.

46. The computer program product of claim 45, wherein the computer program product is operable such that the comparing the generated the one or more hash values includes:
determining whether the plurality of e-mail messages originated from the one or more known legitimate mailing lists.

47. The computer program product of claim 27, wherein the generating the one or more hash values includes:
hashing a main text to generate a first hash value, and
hashing one or more sender-related header fields to generate one or more second hash values.

48. The computer program product of claim 47, wherein the computer program product is operable such that the one or more sender-related header fields include at least one of a From header field, a Sender header field, or a Reply-To header field.

49. The computer program product of claim 47, wherein the computer program product is operable such that the counting the one or more of the generated hash values associated with the at least one of the plurality of e-mail messages that match the one or more hash values associated with the at least one prior e-mail message includes:
   determining a first suspicion count based on a number of the hash values associated with the at least one prior e-mail message that match the first hash value, and
   determining one or more second suspicion counts based on a number of the hash values associated with the at least one prior e-mail message that match the one or more second hash values.

50. The computer program product of claim 49, wherein the computer program product is operable such that the determining that at least one of the plurality of e-mail messages is a potentially unwanted e-mail message includes:
   determining that the at least one of the plurality of e-mail messages is the potentially unwanted e-mail message when the first suspicion count is higher than the one or more second suspicion counts.

51. The computer program product of claim 27, wherein the computer program product is operable such that the generating the one or more hash values includes:
   hashing a main text of the plurality of e-mail messages to generate at least one main text hash, and
   hashing at least one header field of the plurality of e-mail messages to generate at least one header hash.

52. The computer program product of claim 51, wherein the computer program product is operable such that the counting the one or more of the generated hash values associated with the at least one of the plurality of e-mail messages that match the one or more hash values associated with the at least one prior e-mail message includes:
   determining whether the at least one main text hash matches a substantially higher number of the hash values associated with the at least one prior e-mail message than the at least one header hash; and
   wherein the determining that at least one of the plurality of e-mail messages is a potentially unwanted e-mail message includes:
      determining that the at least one of the plurality of e-mail messages is the potentially unwanted e-mail message when the at least one main text hash matches a substantially higher number of the hash values associated with the at least one prior e-mail message than the at least one header hash.

53. The computer program product of claim 37, wherein the hash values are stored using one or more bloom filters.

54. The computer program product of claim 27, wherein the computer program product is operable such that the one or more bloom filters are used in connection with the determining that the at least one of the plurality of e-mail messages is the potentially unwanted e-mail message.

55. The computer program product of claim 27, wherein the computer program product is operable such that the one or more corresponding generated hash values each serve as a signature for data over which the one or more corresponding generated hash values was computed.

56. The computer program product of claim 27, wherein the computer program product is operable such that the at least one suspicion score for the at least one of the plurality of e-mail messages is based on whether the count of the one or more of the generated hash values exceeds a threshold.

57. The computer program product of claim 56, wherein the threshold is a settable threshold.

58. The computer program product of claim 27, wherein the one or more generated hash values includes a plurality of generated hash values.

59. The computer program product of claim 27, wherein the one or more of the hash values associated with the at least one prior e-mail message include one or more hash values of at least one portion of content of the at least one prior e-mail message that was determined to be a known unsolicited commercial e-mail message.

60. The computer program product of claim 27, wherein the computer readable medium includes non-volatile memory.

61. The computer program product of claim 27, wherein the computer program product is operable such that the one or more hash values are generated using a hash function that provides a distribution of values over a variety of data inputs sufficient to prevent hash collisions.

62. The computer program product of claim 27, wherein the computer program product is operable such that the one or more of the generated hash values are indexed.

63. The computer program product of claim 27, wherein the computer program product is operable such that the at least one suspicion score includes a suspicion count.

64. The computer program product of claim 27, wherein the computer program product is operable such that the at least one suspicion score is based on a scoring function.

65. The computer program product of claim 27, wherein the computer program product is operable such that the at least one suspicion score is based on a scoring function that is a function of a plurality of subparts of the plurality of e-mail messages.

66. The computer program product of claim 27, wherein the computer program product is operable such that at least a portion of the computer code is executed at a server.

67. The computer program product of claim 27, wherein the computer program product is operable such that the remedial action is programmable.

68. The computer program product of claim 27, wherein the one or more of the generated hash values includes one generated hash value.

69. The computer program product of claim 27, wherein the at least one prior e-mail message includes one prior e-mail message.

70. The computer program product of claim 27, wherein the at least one suspicion score includes one suspicion score.

71. The computer program product of claim 27, wherein the one or more of the hash values associated with the at least one prior e-mail message include one or more hash values of the at least one prior e-mail message.

72. The computer program product of claim 27, wherein the one or more of the hash values associated with the at least one prior e-mail message include one or more hash values of the at least one prior e-mail message that was determined to be a known unsolicited commercial e-mail message.

73. A system including a processor and a non-transitory computer-readable medium, comprising:
   means for receiving a plurality of e-mail messages;
   means for processing the plurality of e-mail messages by removing HTML comments and HTML tags from the plurality of e-mail messages;
   means for generating one or more hash values based on one or more portions of the plurality of e-mail messages such that each of the plurality of e-mail messages has one or more corresponding generated hash values;

means for counting the one or more of the generated hash values associated with at least one of the plurality of e-mail messages that match one or more hash values associated with at least one prior e-mail message;

means for determining that the at least one of the plurality of e-mail messages is a potentially unwanted e-mail message based on the counting of the one or more of the generated hash values associated with the at least one of the plurality of e-mail messages that match the one or more of the hash values associated with the at least one prior e-mail message;

means for generating at least one suspicion score for the at least one of the plurality of e-mail messages based on the counting of the one or more of the generated hash values associated with the at least one of the plurality of e-mail messages that match the one or more hash values associated with the at least one prior e-mail message; and means for taking remedial action on the at least one of the plurality of e-mail messages that is determined to be the potentially unwanted e-mail message, based on the at least one suspicion score, the taking remedial action including deleting a newly received e-mail message.

74. The system of claim 73, wherein the system is operable such that the generating the one or more hash values includes:
performing a plurality of hashes on a plurality of variable-sized blocks of a main text of the plurality of e-mail messages.

75. The system of claim 73, wherein the system is operable such that the generating the one or more hash values includes:
performing a plurality of hashes on a plurality of fixed-sized blocks of a main text of the plurality of e-mail messages.

76. The system of claim 73, wherein the system is operable such that the generating the one or more hash values includes:
attempting to expand an attachment of the plurality of e-mail messages, and
hashing the attachment after attempting to expand the attachment.

77. The system of claim 73, wherein the system is operable such that the generating the one or more hash values includes:
performing a plurality of hashes on a plurality of variable-sized blocks of an attachment of the plurality of e-mail messages.

78. The system of claim 73, wherein the system is operable such that the generating the one or more hash values includes:
performing a plurality of hashes on a plurality of fixed-sized blocks of an attachment of the plurality of e-mail messages.

79. The system of claim 73, further comprising:
means for comparing the generated hash values to hash values corresponding to known unwanted e-mails.

80. The system of claim 79, wherein the known unwanted e-mails include at least one of e-mails containing a virus, e-mails containing a worm, or unsolicited commercial e-mails.

81. The system of claim 73, wherein the system is operable such that the generating the one or more hash values and the counting the one or more of the generated hash values that match the hash values associated with the at least one prior e-mail message are performed incrementally as the plurality of e-mail messages are being received.

82. The system of claim 73, further comprising:
means for comparing the generated one or more hash values to hash values associated with one or more known legitimate mailing lists; and
means for passing the plurality of e-mail messages without further examination when the one or more generated hash values associated with the at least one of the plurality of e-mail messages match one or more has values associated with the one or more known legitimate mailing lists.

83. The system of claim 73, wherein the system is operable such that the generating the one or more hash values includes:
hashing a main text of the plurality of e-mail messages to generate a main text hash, and
hashing at least one header field of the plurality of e-mail messages to generate at least one header hash.

* * * * *